United States Patent
Scott et al.

(10) Patent No.: US 10,515,140 B1
(45) Date of Patent: *Dec. 24, 2019

(54) METHOD AND SYSTEM FOR DISPLAYING ITEMS

(71) Applicant: Amazon Technologies, Inc., Seattle, WA (US)

(72) Inventors: Sean Michael Scott, Sammamish, WA (US); Douglas J. Gradt, Seattle, WA (US); Doug Irvine, Seattle, WA (US); Nimrod Hoofien, Seattle, WA (US); Eva Manolis, Bellevue, WA (US); Christopher J. Vigder, Mercer Island, WA (US); Amy Bates, Seattle, WA (US); Max L. Kanter, Seattle, WA (US); Todd A. Heimes, Seattle, WA (US); J. Nathaniel Sloan, Austin, TX (US); Michael Paul Touloumtzis, Seattle, WA (US); Michael L. Weiss, Maple Valley, WA (US); Maren Marie Costa, Seattle, WA (US); Gianna Lise Puerini, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1009 days.

This patent is subject to a terminal disclaimer.

(21) Appl. No.: 14/791,818

(22) Filed: Jul. 6, 2015

Related U.S. Application Data

(63) Continuation of application No. 11/694,726, filed on Mar. 30, 2007, now Pat. No. 9,075,492.

(51) Int. Cl.
*G06F 17/22* (2006.01)
*G06F 3/0481* (2013.01)
*G06F 3/0484* (2013.01)

(52) U.S. Cl.
CPC ........ *G06F 17/2235* (2013.01); *G06F 3/0481* (2013.01); *G06F 3/04817* (2013.01); *G06F 3/04842* (2013.01); *G06F 2203/04806* (2013.01)

(58) Field of Classification Search
CPC ............... G06F 17/2235; G06F 3/0481; G06F 3/04817; G06F 2203/04806
See application file for complete search history.

(56) References Cited

U.S. PATENT DOCUMENTS

| 5,187,776 A | 2/1993 | Yanker |
| 5,754,850 A | 5/1998 | Janssen |

(Continued)

OTHER PUBLICATIONS

Coates, J., "The Chicago James Coates Computers column," Chicago Tribune, Feb. 20, 2006, Publisher: Knight-Ridder Tribune Business News, Published in: Illinois.

(Continued)

*Primary Examiner* — Justin R. Blaufeld
(74) *Attorney, Agent, or Firm* — Athorus, PLLC

(57) ABSTRACT

Methods and systems for selecting and displaying items includes causing the display of a large image of a selected item, a plurality of view icons indicative of different views of the selected item, and item details associated with a selected item. After the customer selects a view and/or color for the large image and mouses over the image, a zoom box appears and a corresponding magnified image window appears with a magnified image of the zoom box image for the selected view and color of the item.

33 Claims, 15 Drawing Sheets

(56) References Cited

U.S. PATENT DOCUMENTS

| | | | |
|---|---|---|---|
| D395,426 S | 6/1998 | Chiba | |
| D403,313 S | 12/1998 | Peppel | |
| 5,889,517 A | 3/1999 | Ueda et al. | |
| D418,120 S | 12/1999 | Okura et al. | |
| D418,495 S | 1/2000 | Brockel et al. | |
| 6,054,990 A * | 4/2000 | Tran | G06F 3/0481 345/179 |
| D427,574 S | 7/2000 | Sawada et al. | |
| 6,101,480 A | 8/2000 | Conmy et al. | |
| 6,268,854 B1 | 7/2001 | Borden et al. | |
| 6,288,702 B1 * | 9/2001 | Tachibana | G06F 3/0481 345/671 |
| 6,320,602 B1 | 11/2001 | Burkardt et al. | |
| D459,360 S | 6/2002 | Leon et al. | |
| D470,857 S | 2/2003 | Anderson et al. | |
| D474,778 S | 5/2003 | Barnes | |
| 6,678,891 B1 | 1/2004 | Wilcox et al. | |
| 6,728,706 B2 | 4/2004 | Aggarwal et al. | |
| 6,795,810 B2 | 9/2004 | Ruppelt et al. | |
| 6,798,630 B1 | 9/2004 | Del Vecchio et al. | |
| RE38,609 E | 10/2004 | Chen et al. | |
| D513,511 S | 1/2006 | Decombe | |
| 6,983,420 B1 | 1/2006 | Itou et al. | |
| 7,058,902 B2 | 6/2006 | Iwema et al. | |
| D528,553 S | 9/2006 | Nevill-Manning et al. | |
| D528,556 S | 9/2006 | Decombe | |
| D529,036 S | 9/2006 | Koch et al. | |
| D529,037 S | 9/2006 | Koch et al. | |
| D529,509 S | 10/2006 | Stabb | |
| D529,920 S | 10/2006 | Nevill-Manning et al. | |
| D530,336 S | 10/2006 | Thomsen | |
| 7,149,710 B1 * | 12/2006 | Edmark | G06Q 30/06 705/26.8 |
| D534,543 S | 1/2007 | Gusmorino et al. | |
| 7,167,876 B2 | 1/2007 | Cookson et al. | |
| 7,197,718 B1 * | 3/2007 | Westerman | G06F 3/0485 345/660 |
| D541,291 S | 4/2007 | Zhou et al. | |
| D546,336 S | 7/2007 | Vong et al. | |
| D548,743 S | 8/2007 | Takahashi et al. | |
| D554,652 S | 11/2007 | Shen et al. | |
| D554,654 S | 11/2007 | Waldeck | |
| 7,310,105 B2 | 12/2007 | Yamada | |
| 7,353,461 B2 | 4/2008 | Davidsson et al. | |
| 7,379,053 B2 | 5/2008 | Schaefer | |
| 7,447,425 B2 | 11/2008 | Gong | |
| 7,551,187 B2 * | 6/2009 | Agrawala | G06F 3/04883 345/660 |
| 7,580,867 B2 | 8/2009 | Nykamp | |
| 7,603,367 B1 | 10/2009 | Kanter et al. | |
| 7,676,759 B2 | 3/2010 | Carter | |
| 7,693,753 B1 * | 4/2010 | Purdy | G06Q 30/0643 705/27.2 |
| 7,698,647 B2 | 4/2010 | Steeb et al. | |
| 7,774,712 B2 * | 8/2010 | Laff | G06F 3/0481 715/708 |
| 7,882,156 B2 | 2/2011 | Wykes et al. | |
| 7,904,411 B2 | 3/2011 | Bechtel et al. | |
| 8,707,214 B2 | 4/2014 | Horvitz et al. | |
| 8,797,327 B2 | 8/2014 | Finn et al. | |
| 2002/0042755 A1 | 4/2002 | Kumar et al. | |
| 2002/0087558 A1 | 7/2002 | Bailey et al. | |
| 2002/0113816 A1 * | 8/2002 | Mitchell | G06F 3/0481 715/734 |
| 2002/0138481 A1 | 9/2002 | Aggarwal et al. | |
| 2003/0046700 A1 | 3/2003 | Wilcox et al. | |
| 2003/0050844 A1 | 3/2003 | Ruppelt et al. | |
| 2003/0090474 A1 | 5/2003 | Schaefer | |
| 2003/0160814 A1 * | 8/2003 | Brown | G06F 3/1423 715/732 |
| 2003/0169302 A1 | 9/2003 | Davidsson et al. | |
| 2004/0083239 A1 | 4/2004 | Cookson et al. | |
| 2004/0117271 A1 | 6/2004 | Knight et al. | |
| 2005/0144093 A1 * | 6/2005 | Kassan | G06Q 30/06 705/26.3 |
| 2006/0064652 A1 | 3/2006 | Ahokas | |
| 2006/0071942 A1 * | 4/2006 | Ubillos | G06F 3/0483 345/619 |
| 2006/0179027 A1 | 8/2006 | Bechtel et al. | |
| 2006/0184613 A1 | 8/2006 | Stienessen et al. | |
| 2006/0291737 A1 | 12/2006 | Yamada | |
| 2006/0291738 A1 | 12/2006 | Gong | |
| 2008/0012863 A1 | 1/2008 | Finn et al. | |
| 2009/0064018 A1 | 3/2009 | Horvitz et al. | |
| 2009/0132943 A1 | 5/2009 | Minsky et al. | |

OTHER PUBLICATIONS

Finnegan, F., "Questions and Answers: Windows," Mar.-Apr. 1992, p. 103, vol. 7, No. 2, Publisher: Microsoft Systems Journal.

Girishankar, S., "Build the E-Commerce Catalog—New Content-Management Tools Bring Together Disparate Data Formats and Item Descriptions," InformationWeek, Nov. 29, 1999, vol. 74.

"Online shoes, onlineshoes.com," Jan. 2007.

"Screenshot from the Office for Harmonization in the Internal Market website, (http://oami.europa.eu/RCDOnline/RequestManager)," Mar. 25, 2008, p. 2.

Smith, A., "New Look for Solid Modeling," Computer-aided Engineering, Apr. 1996, pp. 19-24, vol. 15, No. 4.

* cited by examiner

METHOD AND SYSTEM FOR DISPLAYING ITEMS

This application is a continuation of U.S. patent application Ser. No. 11/694,726, filed Mar. 30, 2007, now U.S. Pat. No. 9,075,492, the contents of which are incorporated by reference herein in their entirety.

TECHNICAL FIELD

This disclosure relates generally to methods and systems for displaying items and, more particularly, to a method and system for displaying magnified images of items.

BACKGROUND

It is now commonplace for consumers (or customers or shoppers or buyers) to purchase goods or products from client-server based (on-line or e-commerce or Internet-based) retailers (or merchants). A large number of retailers have set up Internet web sites where consumers can shop for the products (or items or goods) that are available for sale, purchase the products desired, and have the products delivered to them. These products may be tangible goods, such as groceries, books, CDs, DVDs, tools, clothes, footwear, health/beauty items, hardware, or any other tangible goods that are physically delivered to the customer, or "digital" goods, such as electronic books, music, movies/videos, application software, or any other digital product that is downloaded, copied, transmitted or otherwise electronically transferred to the customer.

To find a desired item to purchase, the customer may perform a search using the merchant website search tools. The search results are typically displayed as a list of items that are related to the search request. The customer then selects (or clicks on) a desired item in the list, which causes the website to display the item details, including the item specifications, characteristics, features and/or images of the item. After reviewing the item details, the customer purchases the item, e.g., a pair of shoes, and the item is shipped to the customer. However, when the shoes are received by the customer, it becomes clear that the shoes have a buckle that will dig into the customer's sensitive ankle, an aspect that could have been detected by close visual examination of the item prior to purchase. Thus, the customer must return the item to the merchant and select another pair of shoes to purchase. Such an item purchase and return process can be very inefficient and can lead to buyer frustration that may greatly diminish the shopping experience.

Therefore, the current techniques for purchasing certain products on line do not provide the customer with sufficient visual information to ensure the selected item is properly suited for the customer. Accordingly, it would be desirable to have a system or method for assisting shoppers that overcomes the limitations and inefficiencies of the conventional approaches, that, among other potential benefits, provides a more effective way of allowing the customer to ensure the product is the correct product for the customer, prior to purchase, to avoid unnecessary costs, returns and delays, thereby improving the shopping experience with the merchant.

SUMMARY

Systems and methods for displaying items are disclosed. For example, according to one embodiment of the present disclosure, a method includes causing the display of a large image of a view of a selected item, the view corresponding to a selected one of a plurality of view icons; causing the display of a zoom box over at least a portion of the large image in response to a selection of at least a portion of the large image, the portion of the large image within the zoom box being a zoom box image; causing the display of a magnified image of the zoom box image, the magnified image being larger than the zoom box image; and the magnified image being a predetermined portion of a high resolution image.

For example, when Sue is shopping for shoes, a search results list returns twenty shoes displayed on the merchant web page. When Sue clicks on a shoe image in the list, a zoom detail window (or screen) appears, which shows a large image of the shoe, shows several view icons indicative of several different views of the item, and shows item details about the shoe in an adjacent item details section (e.g., price, availability and available colors, sizes, and widths). When Sue mouses over a right side view icon, the large image changes to show the right side view of the shoe. Then, when Sue mouses over the large image, a zoom box appears over that portion of the image, and a magnified image window appears with a magnified image of the image within the zoom box, allowing Sue to see specific aspects of the desired view of the shoe, such as the buckle and the straps. When Sue moves the mouse along the display in the large image view, the zoom box moves with the mouse, providing magnified details of the shoe where the zoom box is located. After viewing magnified images of several different views of the shoe, Sue decides to purchase the shoes, and this product is shipped to her.

The present disclosure provides a method and system for displaying magnified images of user selectable portions of various different views of items to allow a customer to view the item at the level of detail needed to make a purchase. It allows the customer to easily switch from one view to the next by mousing over view icons and then selectively zooming into each view as desired to magnify areas of interest. Also, the disclosure allows the customer to select an available color for the item and view the item in that color as the large image view and also zoom in on desired portions of the color-selected item without having to changes screens. Further, a portion of the item detail screen section may be used for the "zoom" window or section and automatically switches back to the item detail section when the zoom box is not being used. Still further, the size of the zoom box automatically adjusts to the size of a high resolution image from which the magnified image is displayed.

The foregoing and other objects, features and advantages of the present disclosure will become more apparent in light of the following detailed description of exemplary embodiments thereof.

BRIEF DESCRIPTION OF THE DRAWINGS

FIG. 2 is a screen illustration of a search results items list, in accordance with embodiments of the present disclosure.

FIG. 12 is an illustration of another embodiment of a product selection screen in accordance with the present disclosure illustrating the display of a selected brand of products available for purchase.

FIG. 13 is an illustration of another embodiment of a product selection screen in accordance with the present disclosure illustrating the display of a plurality of selected brands of products available for purchase.

DETAILED DESCRIPTION

Figure 1:
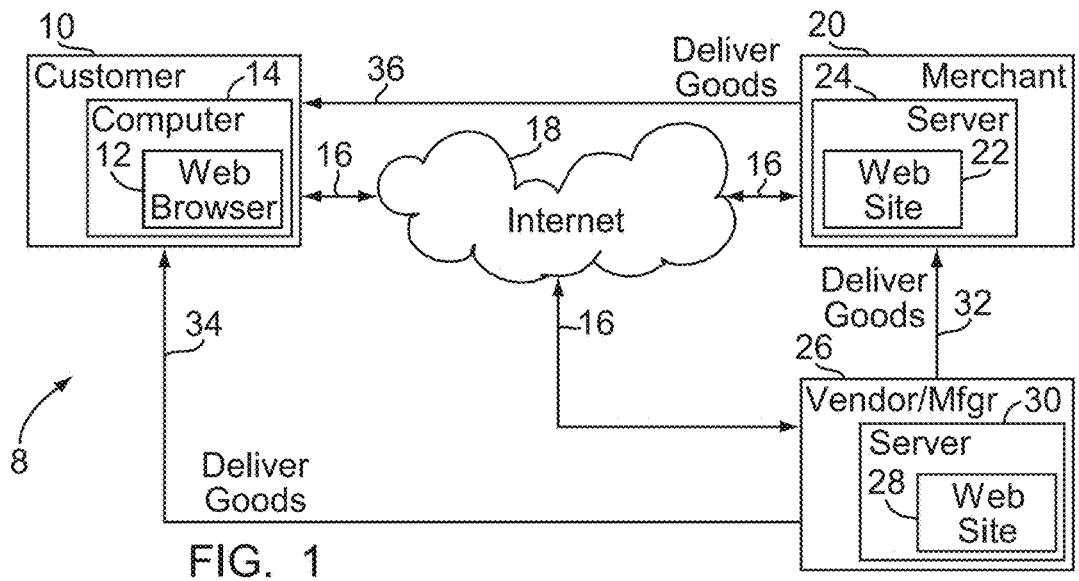
FIG. 1 is a block diagram of the components of a customer-merchant shopping system, in accordance with embodiments of the present disclosure.

FIG. 1 illustrates the principal components of an embodiment of a customer-merchant client-server based ordering system 8, which includes a customer 10 (or consumer or client or shopper or buyer) and an e-commerce or Internet-based merchant (or supplier or retailer or seller or reseller or distributor) 20. The customer 10 can be any entity or individual that wishes to purchase, rent, lease, borrow, or otherwise obtain, goods (or products) or services from the merchant 20. The customer 10 uses a web browser 12 running on a computer 14. The merchant 20 is an entity that sells items from a merchant website 22 which is implemented using one or more physical computer servers 24. The customer computer 14 is connected to or communicates with the merchant server 24 through a communications network 18, such as the Internet, as indicated by lines 16, by sending and receiving of digital data over the communications network 18. The customer 10 uses the web browser 12 as a user interface to view and/or communicate with the merchant website 22 that is displayed on the customer computer 14 allowing the customer 10 to interact with the merchant website 22.

In addition, one or more of the goods ordered by the customer 10 may be made by or obtained from one or more third party vendors (or manufacturers) 26. Also, the merchant 20 may be the vendor 26. The vendor 26 is an entity that manufactures goods or has access to goods that the merchant 20 desires to supply to the customer 10 and may sell the goods to the merchant 20 through a vendor website (or other type of order processor) 28, which is implemented using one or more physical computer servers 30. The vendor computer server 30 is connected to or communicates with the merchant server 24 and the customer computer 14, through the communications network 18, as indicated by lines 16. If used by the merchant 20, the vendor 26 may deliver the desired goods to either the merchant 20 or to the customer 10, as indicated by the lines 32,34, respectively. If the goods are delivered to the merchant 20 from the vendor 26, the merchant 20 delivers the goods to the customer, as indicated by a line 32. There may be more than one vendor 26 that supplies goods to the merchant 20 and/or the customer 10.

The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "merchant" or "vendor" refers to the associated computer systems operated or controlled by a merchant or vendor, respectively. Thus, process steps described as being performed by the "merchant" or the "vendor", may be automated steps performed by their respective computer systems. These steps are implemented within software modules (or computer programs) executed by one or more general purpose computers. For example, the web browser (or user interface) 12 may be implemented on the computer 14 using one or more software applications. Specially designed hardware could alternatively be used to perform certain operations. Process steps described as being performed by a "customer" are typically performed by a human operator via the computer 14, but could, alternatively, be performed by an automated agent.

The customer 10 may use any web-enabled or Internet applications, such as the web browser 12, or any other web-enabled applications or features including email, or other messaging techniques to communicate with (or connect to) the merchant web site 22 and/or server 24 through the communications network 18. In addition, the computer 14 may be any of a number of computing devices that are capable of communicating over the network, including but not limited to set-top boxes, personal digital assistants, mobile phones, digital media players, Web pads, tablets, laptop computers, desktop computers, electronic book readers, and the like. The protocols and components for providing communication between the customer computer 14 and the merchant website 22 and/or server 24 are well known to those skilled in the art of computer communications and thus, need not be described in more detail herein.

The data and/or computer executable instructions, programs, firmware, software and the like (also referred to herein as "computer executable components") described herein may be stored on a computer-readable medium that is within or accessible by the customer computer 14 and/or the server 24, having sequences of instructions which, when executed by a processor (or CPU), cause the processor to perform all or a portion of the functions and/or methods described herein. Such computer executable instructions, programs, software and the like may be loaded into the memory of the customer computer 14 or the server 24, using a drive mechanism associated with the computer readable medium, such as a floppy drive, CD-ROM drive, DVD-ROM drive, network interface, or the like.

In order to make purchases, the customer 10 browses through information concerning goods (or products) or services available for purchase from the merchant 20. After selecting one or more product(s) or service(s) (collectively, "items") that the customer 10 wishes to purchase, an order is sent to the merchant 20. The order is placed via a communication from the web browser 12 to the web site 22 operating on the server 24 of the merchant 20, which includes payment by the customer 10 to the merchant 20 for the items. The merchant 20 then delivers the items to the customer 10 as indicated by the line 36. Alternatively, the vendor 26 may deliver the items directly to the customer 10 as indicated by the line 34.

Figure 2:
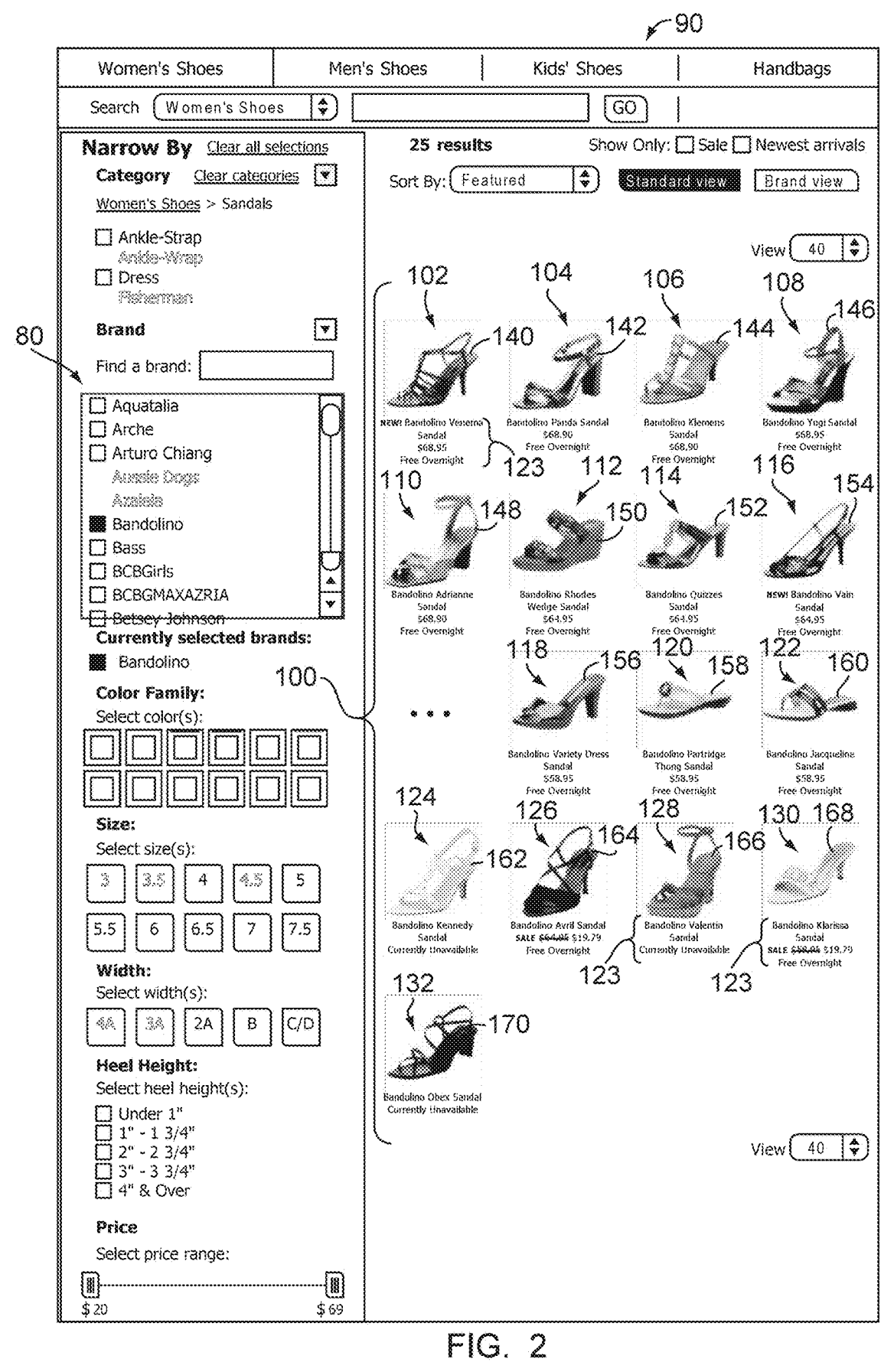

Referring to FIG. 2, a sample merchant website screen 90 (or graphical user interface (GUI) or web page or browser screen) for use by the customer 10 in selecting items for purchase from the merchant 20 via the web site 22, includes a search results list (or group, or set, or collection) 100 of one or more items 102-132. As used herein, the term "list" includes, but is not limited to any list, group, set, or collection of two or more items. The items list 100 may be displayed on one or more separate screens or web pages. The number of screens and the number of items on each screen depends on the format and content of images displayed in the items list 100. Each of the items 102-132 has corresponding unique images 140-170 associated therewith. In addition, there may be a brief description 123 of each item on the list 100, such as the item name, manufacturer, availability (e.g., in stock, out of stock, discontinued, etc.), price, shipping cost, and the like. The sample screen 90 shows search results for women's shoes, and, in particular, women's sandals having the Bandolino brand, and shows a product filter window or section 80 similar to that described in U.S. patent application Ser. No. 11/694,675, entitled "Method and System for Selecting and Displaying Items," having the same filing date as U.S. patent application Ser. No. 11/694,726, which is incorporated herein by reference in its entirety. However, the scope of the present disclosure is not limited in this regard as the system and method of the present disclosure can be utilized in connection with any items list or any other grouping or list having any types of items, such as a list of items in a shopping cart, on a wish list, or any other type of items list in any format, including text and/or images, or any other format. Further the present disclosure may be used with an individual item not in a list.

Figure 3:
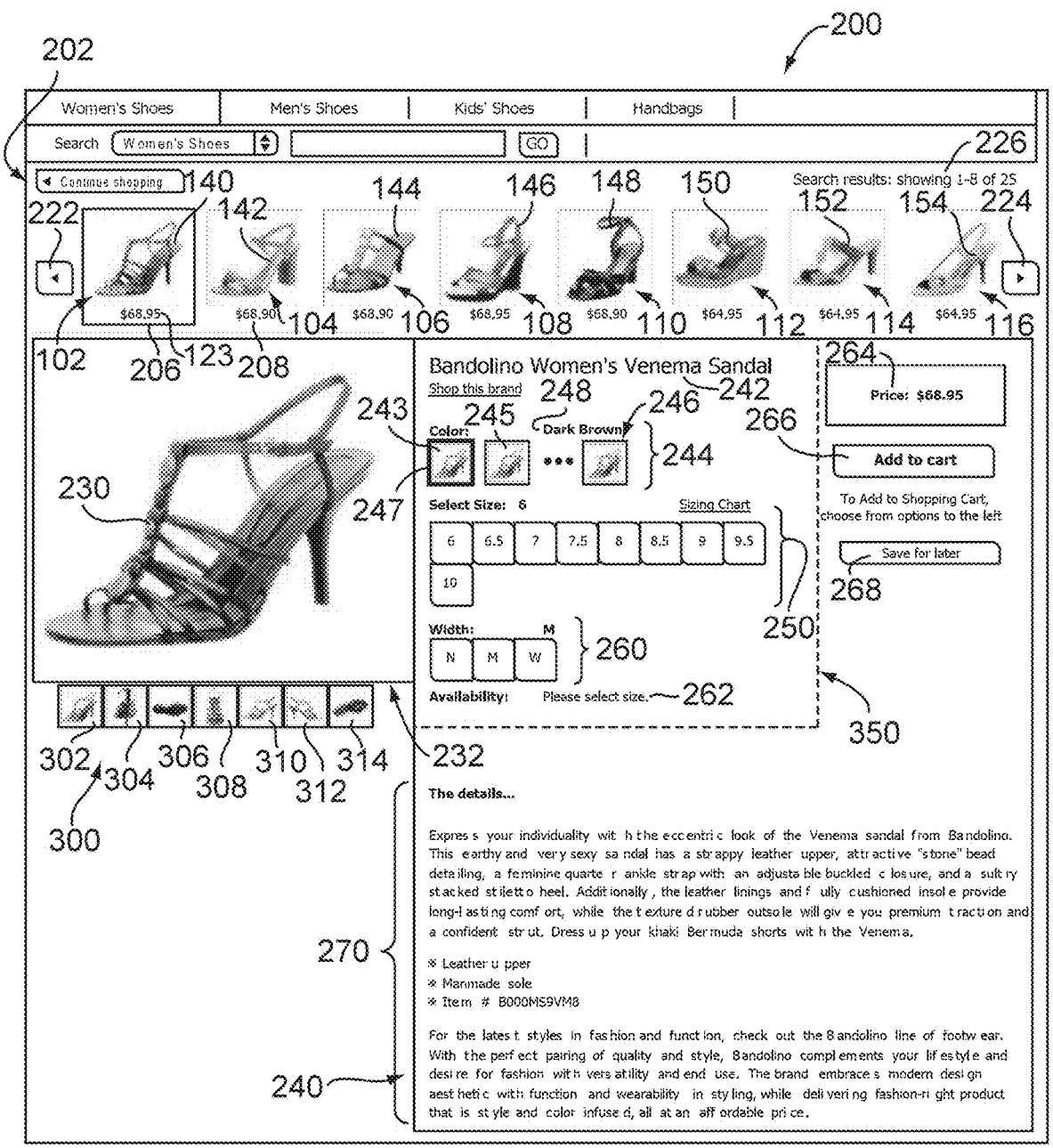
FIG. 3 is a screen illustration of a zoom detail window, in accordance with embodiments of the present disclosure.

Referring to FIG. 3, when the customer 10 selects (or clicks on) one of the items 102-132 in the list 100 (FIG. 2), e.g., the first item 102, a Bandolino Venema Sandal, a zoom detail window or screen 200 appears. The zoom detail screen 200 includes a large image view window or screen section 232, a plurality of small thumbnail image views (or image view icons or view icons) 300, and an item (or product) detail window 240. In addition, an optional slide show viewer (or slider) window or screen section 202 may also be displayed which allows the customer 10 to select other items from the list 100 without having to leave the web page, such as is described in U.S. patent application Ser. No. 11/694,597, entitled "Method and System for Selecting and Displaying Items," which has the same filing date as U.S. patent application Ser. No. 11/694,726, and is incorporated herein by reference in its entirety (discussed more hereinafter).

In the large image view section 232 on the screen 200 is a large image 230 of the selected item 102. Below the large image view section 232 are the view icons 302-314 (collectively, numeral 300), each indicative of a different view of the item 102. For example, the view icon 302 is a right side elevated perspective view, shown as the large image 230 in the large image section 232. Also, the view icon 304 is a back view of the item 102, the view icon 306 is a bottom view of the item 102, the view icon 308 is a front view of the item 102, the view icon 310 is a right side view of the item 102, the view icon 312 is a left side view of the item 102, and the view icon 314 is a top view of the item 102.

When the customer 10 mouses over (or selects) one of the view icons 302-314, the associated image is displayed as a large image in the large image view section 232. Thus, the customer 10 may sequentially view a plurality of different views of the item 102 prior to purchase on the same browser screen using the "mouse-over" feature (thus, no new browser screen is generated for each different view displayed). Although there are seven view icons 302-314 shown in the embodiment of FIG. 3, any number of view icons 300 may be used and the view icons 300 may be displayed in any order. The mouse-over selection of the view icons 300 allows the customer 10 to easily change views by moving the mouse across the icons 300. Instead of or in addition to mousing over the view icons 300 to select the large image view in the section 232, the customer 10 may select a view by clicking on the corresponding icon 300.

Figure 4:
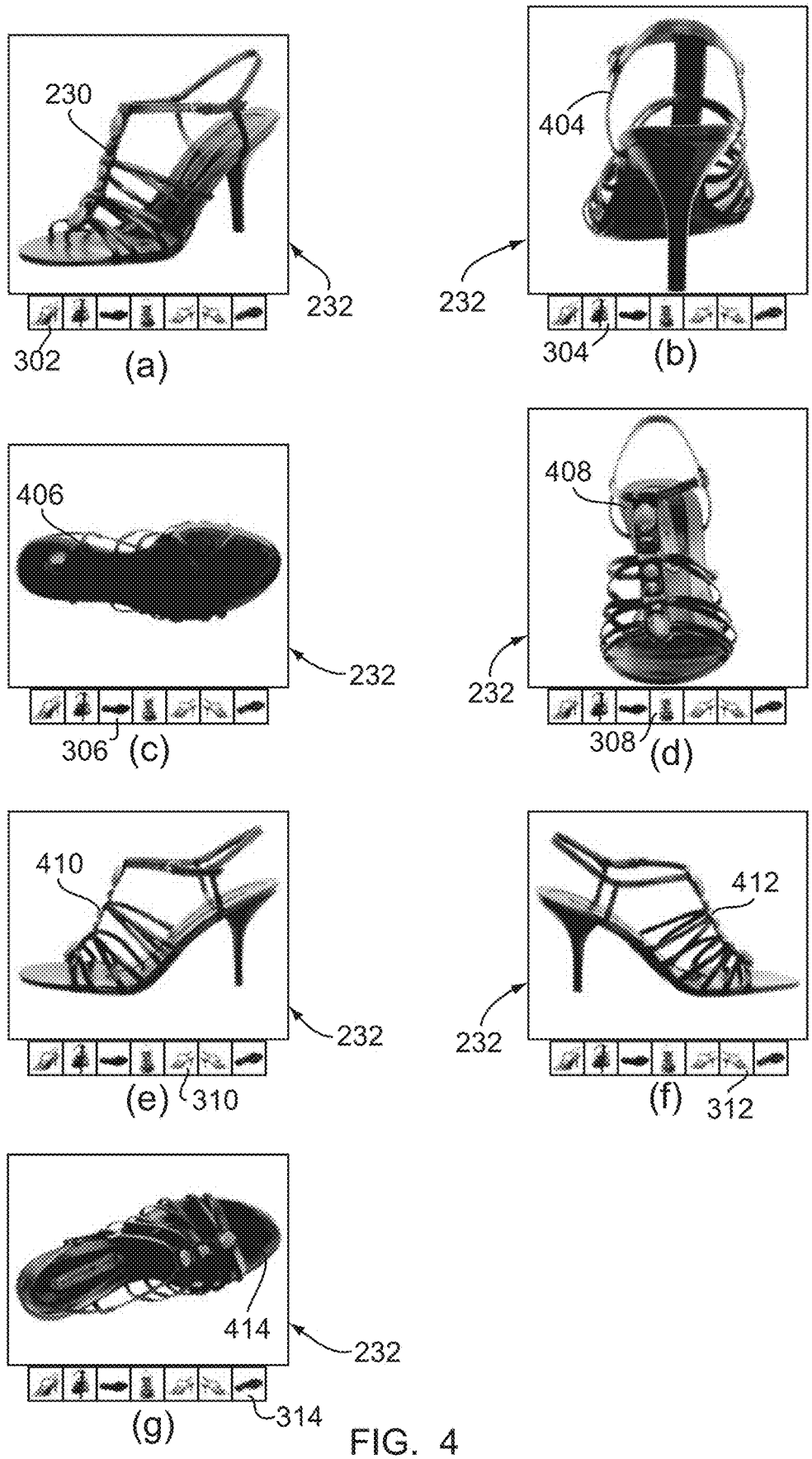
FIG. 4, illustrations (a)-(g), show various different image views of an item, in accordance with embodiments of the present disclosure.

Referring to FIG. 4, illustrations (a)-(g), more specifically, each of the view icons 302-314 are shown having the large images 230,404-414, respectively, as the large image in the large image section 232. In particular, FIG. 4, illustration (a) shows the image 230 as the large image if a right side perspective view of the item 102 corresponding to the view icon 302; illustration (b) shows a large image 404 of a back view of the item 102 corresponding to the view icon 304; illustration (c) shows a large image 406 of a bottom view of the item 102 corresponding to the view icon 306; illustration (d) shows a large image 408 of a front view of the item 102 corresponding to the view icon 308; illustration (e) shows of an image 410 of a right side view of the item 102 corresponding to the view icon 310; illustration (f) shows an image 412 of a left side view of the item 102 corresponding to the view icon 312; and illustration (g) shows an image 414 of a top view of the item 102 corresponding to the view icon 314.

Referring again to FIG. 3, to the right of the large image view screen section 232 is the item (or product) detail window or screen section 240 having a header or title 242 with the name of the selected item 102, in this example, "Bandolino Women's Venema Sandal". The section 240 contains predetermined detail information about the selected item 102. In particular, there may be a color selector 244, a size selector 250, a width selector 260. The color selector 244, the size selector 250 and the width selector 260 may provide an interactive attribute selection and availability feature or tool for displaying available colors, sizes and widths, for the selected item 102, as is described in detail in U.S. patent application Ser. No. 11/694,597, entitled "Method and System for Selecting and Displaying Items," which has the same filing date as U.S. patent application Ser. No. 11/694,726, and is incorporated herein by reference in its entirety. When the customer 10 selects an attribute in one of the selectors 244,250,260, the other selectors are all automatically updated to indicate the availability of their respective attributes based on the selected attribute, as is discussed in the aforementioned patent application. Further, selectors 244,250,260 and the availability indicator 262 may be located within a zoom window or screen section 250

(discussed more hereinafter) within the items details section 240. Also, the item details section 240 may have an availability field 262 indicative of the availability of the selected item 102 based on attributes selected in the selectors 244, 250,260.

In addition, the section 240 may have a price field 264, displaying the current price or sale price of the item; an "add to cart" button 266, that allows the customer 10 to add the item 102 to the shopping cart; and/or a "save for later" button 268 that allows the customer 10 to save the information on the current screen for later use. Also, the section 240 may have a section 270 labeled "The details.", which provides a narrative description of the item and some item features, attributes, characteristics, and suggestions of the selected item 102 that may be of interest to the customer 10. Other item details, attributes, features, characteristics, marketing information, and/or specifications may be included in the item details screen 240.

When the selected item 102 can be purchased in different colors, the item detail window 240 may provide an interactive item color viewing feature that allows the customer 10 to view a large view of the selected item in the selected color. In particular, if the shoe 102 is available in a plurality of colors, the color selector 244, may have color item thumbnail images (or color icons or color selectors) 246, one for each of the available colors for the item 102. When the customer 10 selects (mouses over or clicks on) one of the color icons 246, a color description 248 appears, e.g., dark brown, black, yellow, dark red leather, black fabric, etc., describing the color and/or the material or "feel" of the item.

For example, if the customer 10 mouses over the color icon 243, e.g., indicative of the color dark brown, the color field 248 shows "dark brown" as the color, and the image 230 in the large image view section 232 becomes an image of the item 102 in the color dark brown. When the customer 10 mouses over the next color icon 245, indicative of the color black, the color field 248 shows "black" as the color, and the image 230 in the large image view section 232 becomes an image of the item 102 in the color black. A similar process is performed for any of the color icons 246 in the color selector 244.

Also, if the customer 10 clicks on one of the color icons 244, e.g., the icon 243, a dark box 247 appears around the corresponding color icon 244, the large image 230 "locks" (or becomes fixed) with that color image when the mouse is moved away from the color icons, and the view icons 300 update to provide view icons 300 for the selected color. The customer 10 can then mouse over the icons 300 and view various different views of the large image 230 in the section 232 of the selected item 102 in the selected color. Thus, the customer 10 can easily view various views of large images of the shoe in a selected color in the section 232 to assist in purchasing the proper color shoe. This color viewing feature may apply to any item sold by the merchant and desired to be used by the customer.

It should be understood that for any of the embodiments herein, when an image (or icon) in the zoom detail screen 200 is selected, e.g., the view icons 300, the item detail screen 204 icons, or anywhere else in the zoom detail screen 200, the screen may be updated to display the associated image with a box, an outline, a color, shading, shadow, or some type of highlighting, mark, or indicia, so that the selected status thereof is distinguishable from the icons that have not been selected. Also, the view icons 300 and the color icons 246 may be small thumbnail images of the selected item or may be other graphical or text icons, buttons, or selectors indicative of the function to be performed.

The interactive interface for the color, size and width attributes described hereinbefore is similar to that described in U.S. patent application Ser. No. 11/617,998, filed Dec. 29, 2006, entitled "Methods and Systems for Selecting Item Variations for Display In User Interfaces," which is incorporated herein by reference in its entirety.

Figure 5:
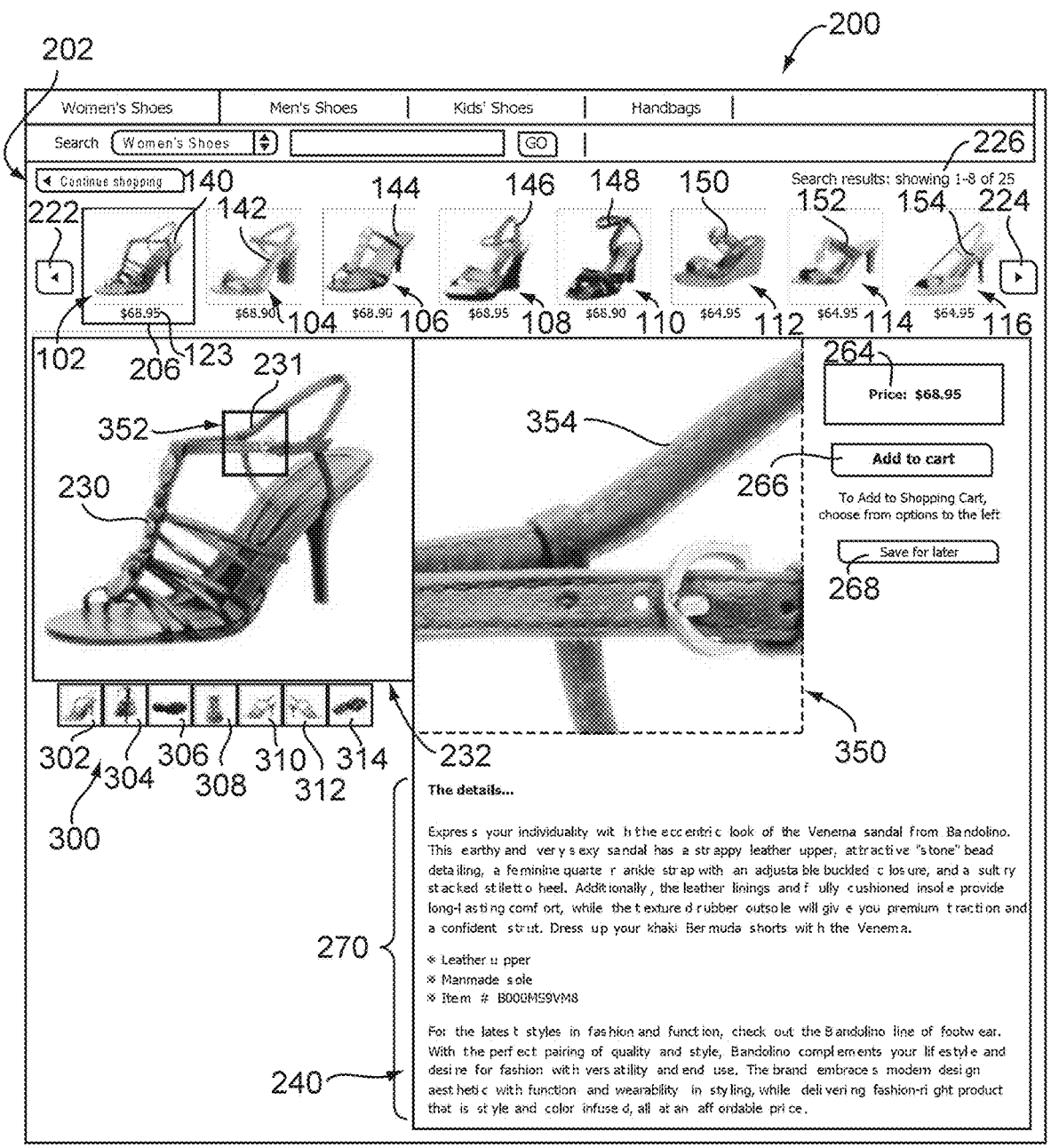
FIG. 5 is a screen illustration of another zoom detail window showing a magnified image section, in accordance with embodiments of the present disclosure.

Referring to FIG. 5, if the customer 10 moves the mouse cursor over (or mouses over) the large image 230 in the large image view section 232, a zoom box 352 appears over a portion of the image 230 around where the mouse cursor is located. At the same time, the magnified image screen or window 350 in the item details section 240, displays a magnified (or enlarged) image 354 of the image within the zoom box 352. In the example of FIG. 5, the zoom box 352 is over the buckle and a portion of the upper strap of the shoe image 230. The magnification (or enlargement) from the image 231 in the zoom box 352 to the magnified image 354 in the magnified image screen or window 350 is determined as discussed hereinafter with FIG. 9. However, any magnification can be used that displays the magnified image 352 in the magnified image screen 350 larger than the image 231 in the zoom box 352.

Figure 9:
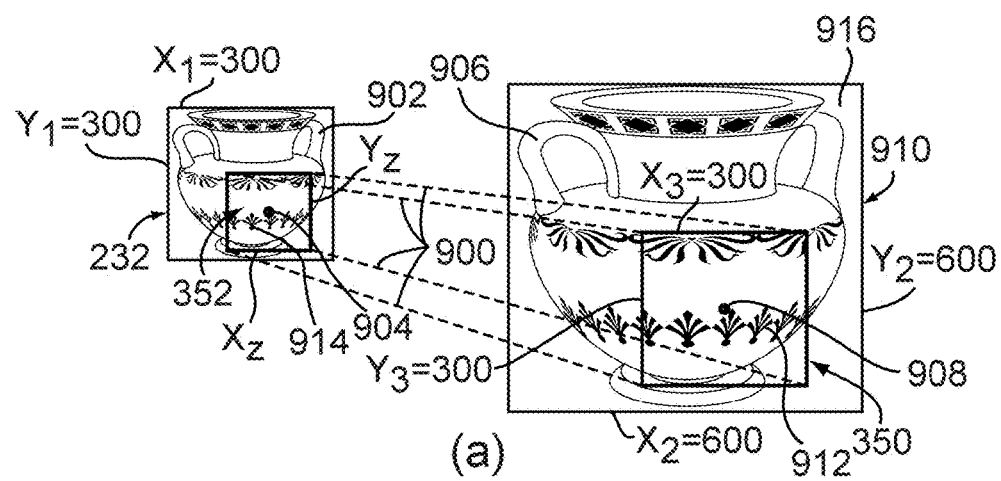
FIG. 9, illustrations (a)-(c), shows various different high resolution image sizes and corresponding zoom box sizes, in accordance with embodiments of the present disclosure.
Figure 9:
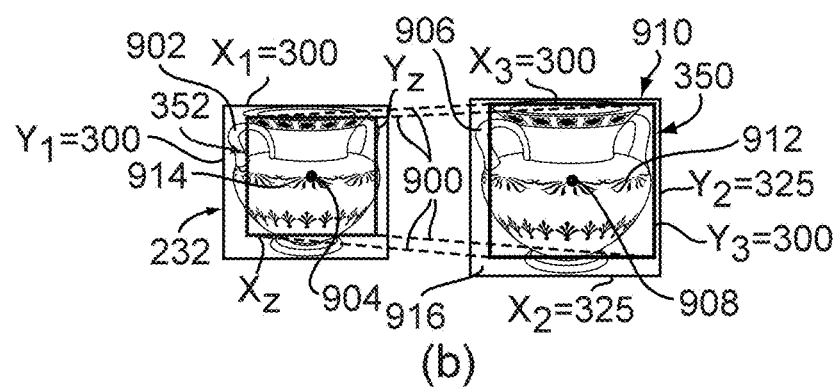
Figure 9:
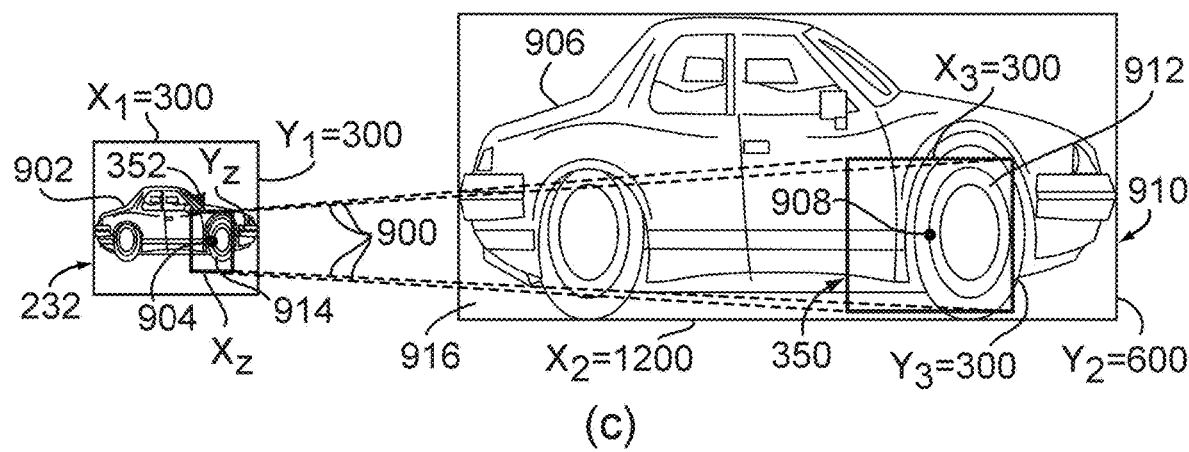

Referring to FIG. 9, illustrations (a)-(c), the magnified image 354 (FIG. 5) within the magnified image window (or zoom image screen) 350 may be formed by displaying a portion 912 (FIG. 9) of a second high resolution image 906 in the large image view window 232. In particular, referring to FIG. 9, illustration (a), the image view window 232 may have a low resolution image 902. The dimensions of the image view window 232 are X1 by Y1, e.g., 300 pixels by 300 pixels. Also, there is a high resolution image 906 that has an image frame 910 having dimensions X2 by Y2, e.g., 600 pixels by 600 pixels. In such a case, when the customer 10 mouses over the image 902 in the image view window 232, a mouse cursor location is used as a reference point for the center 904 of the zoom box 352. For example, in some embodiments, the mouse cursor location defines the center point 904 of the zoom box 352; however, the mouse cursor location may define any other reference point for the zoom box and, thus, may be located at a corner of the zoom box 352 or even outside of the zoom box 352, among many other possibilities. The location of the center point 904 of the zoom box 352 is mapped onto a corresponding point 908 on the high resolution image 906. This mapping may be done by knowing the x,y location of the mouse cursor with respect to the center point 904 within the image view window 232, the size of the image view window 232, e.g., 300×300 pixels, and the size of the high resolution image frame 910, e.g, 600×600 pixels. The corresponding location 908 of the center point 904 in the high resolution image 906 can then be determined, e.g., by calculating the percentage along the x and y dimensions that the center point 904 is located within the image view window 232 and applying these percentages to the corresponding x,y dimensions of the frame 910 to locate the corresponding point 908 within the frame 910 for the image 906. Other techniques may be used to determine the location of the point 908. The points 904,908 may be called "anchor points" or "reference points" as they are the points from which the boxes 352,350 are derived.

Once the location of the anchor point 908 on the high resolution image is determined, a portion 912 of the image 906 for the magnified image window 350 is identified based on the dimensions X3,Y3 of the window 350, e.g., 300×300 pixels. Thus, in that case, the window 350 would be the portion 912 of the image 906 that is defined by a box which is 150 pixels up, down, left, and right of the anchor point 908 for the image data. The aspect ratio of the dimensions of the high resolution image frame 910 to the dimensions of the magnified image window 350, when applied to the dimensions of the image view window 232, determines the dimensions Xz,Yz of the zoom box 352. For example, in that case, the horizontal (X) aspect ratio may be calculated as X3/X2=300/600=0.5, and the vertical (Y) aspect ratio may be calculated as Y3/Y2=300/600=0.5. Applying this aspect ratio to the dimensions X1,Y1 of the image view window 232, provides the zoom box 352 dimensions Xz,Yz of: Xz=X1*0.5=300*0.5=150 pixels; and Yz=Y1*0.5=300*0.5=150 pixels, centered around the point 904. Thus, the zoom box 352 dimensions Xz,Yz are such that the portion 914 of the image 902 within the zoom box 352 is indicative of the portion 912 of the high resolution image 906 in the magnified image window 350.

Referring to FIG. 9, illustration (b), if the dimensions of the high resolution image frame 910 are only slightly larger than the magnified image window 350, e.g., X2=325, Y2=325 and X1=300, Y1=300 pixels, the size of the zoom box 352 is calculated to be a relatively large portion of the image view window 232. For example, in such a case, the horizontal (X) aspect ratio is X3/X2=300/325=0.923 and the vertical (Y) aspect ratio is Y3/Y2=300/325=0.923. Applying this aspect ratio to the dimensions X1,Y1 of the image view window 232 provides the zoom box 352 dimensions Xz,Yz of: Xz=X1*0.923=300*0.923=277 pixels (rounded to the nearest pixel); and Yz=Y1*0.923=300*0.923=277 pixels (rounded to the nearest pixel). Thus, the zoom box 352 dimensions Xz,Yz are again set such that the portion 914 of the image 902 within the zoom box 352 is indicative of the portion 912 of the high resolution image 906 in the magnified image window 350. Thus, because the aspect ratios are close to 1, the zoom box is a large portion of the view window 232.

Referring to FIG. 9, illustration (c), if the horizontal and vertical dimensions X2,Y2 of the high resolution image frame 910 are not the same value, e.g., X2=1200, Y2=600 pixels (a rectangle instead of a square), the dimensions Xz,Yz of the zoom box 352 will adjust accordingly. For example, in such a case, the horizontal (X) aspect ratio is X3/X2=300/1200=0.25 and the vertical (Y) aspect ratio is Y3/Y2=300/600=0.5. Applying this aspect ratio to the dimensions X1,Y1 of the image view window 232, provides the zoom box 352 dimensions Xz,Yz of: Xz=X1*0.25=300*0.25=75 pixels (rounded to the nearest pixel); and Yz=Y1*0.5=300*0.5=150 pixels (rounded to the nearest pixel). Thus, the zoom box 352 dimensions Xz,Yz are again set such that the portion 914 of the image 902 within the zoom box 352 is indicative of the portion 912 of the high resolution image 906 in the magnified image window 350. In this example, the high resolution image 906 is a rectangular shape because the image 906 that shape maximized the amount of the image in the frame 910. Thus, the zoom box in this example, is a corresponding rectangular shape based on the aspect ratios.

Therefore, the dimensions Xz,Yz of the zoom box 352 may be determined using the following equations:

$$Xz = X1(X3/X2) \quad \text{Eq. 1}$$

$$Yz = Y1(Y3/Y2) \quad \text{Eq. 2}$$

where X1, Y1 are the dimensions of the large image window 232, X2,Y2 are the dimensions of the high resolution image frame 910 (or the outer dimensions of the high resolution image 906), and X3,Y3 are the dimensions of the magnified image window 350. Other equations may be used provided the zoom box size is set based on the aspect ratio of the high resolution image 906 to the magnified image window 350.

It should be understood that the high resolution image may be a cropped image, e.g., the frame 910 around the high resolution image 906 may be as close as possible to the outer edges of the image 906 in both the X and Y dimensions to minimize the amount of blank space 916 in the high resolution image 906. This minimizes the magnification of unnecessary aspects of the image and maximizes the image resolution for a given set of pixel dimensions. In addition, this zoom technique automatically adjusts for different aspect ratios between the high resolution image frame 910 and the magnified image window 350. Further, the anchor points 904,908 from which the boxes 352,350 are derived, respectively, need not be in the center of the boxes 352,350, but may be any located anywhere in the window frames 232,910, provided the boxes 352,350 can be formed on their respective images 902,906 therefrom. Also, it should be understood that the dimensions of the magnified image window 350 and the zoom box 352 may be any values and the shape need not be square, and the technique discussed herein will adjust accordingly to the shape and size of same.

Figure 6:
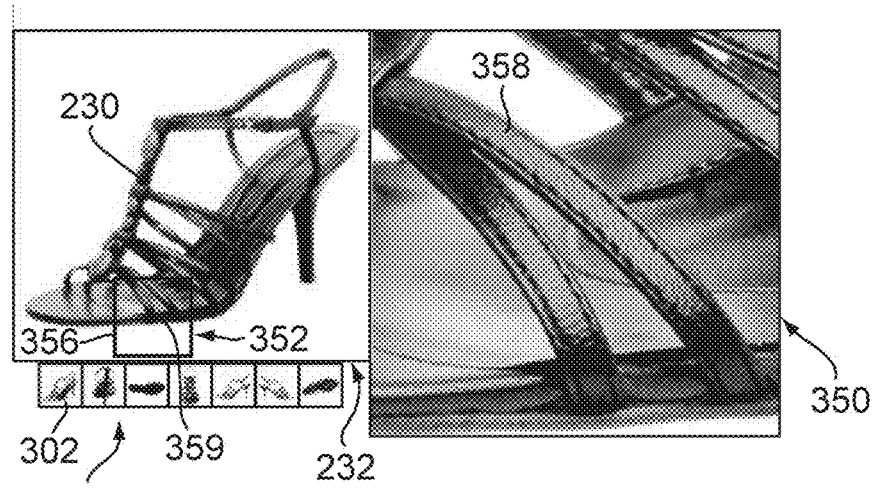
FIG. 6, illustrations (a)-(c), show various different image views of an item with selected magnified image section, in accordance with embodiments of the present disclosure.
Figure 6:
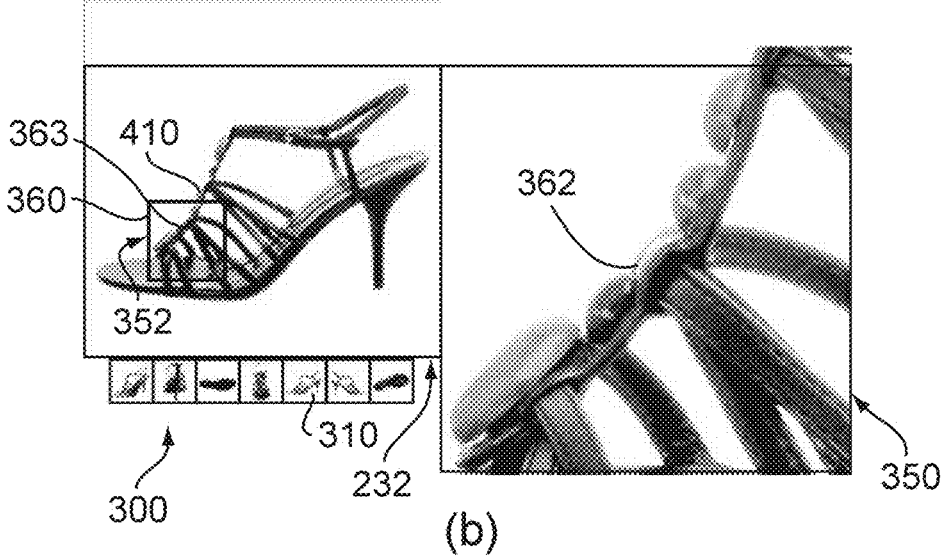
Figure 6:
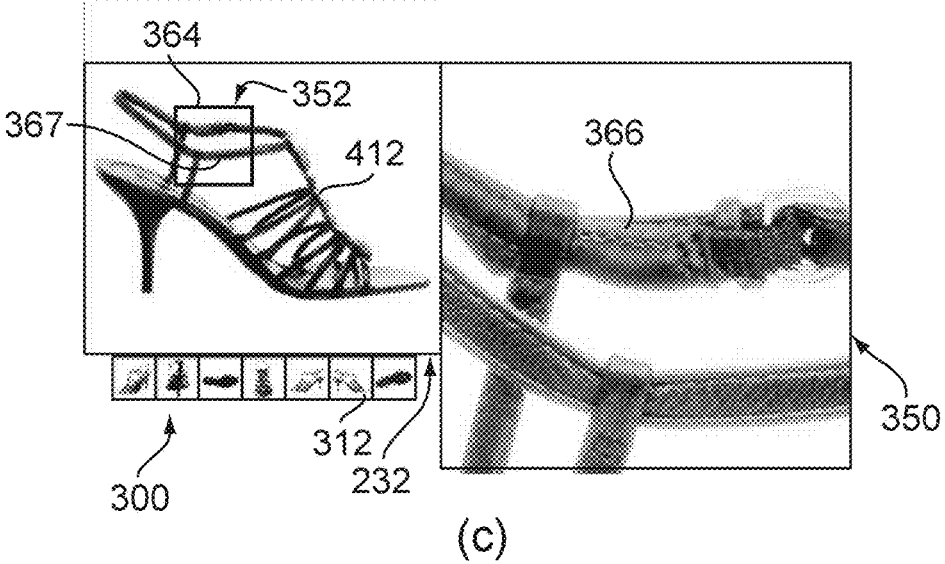

Referring to FIG. 6, illustration (a), when the customer 10 moves the mouse to a new position 356 on the image 230, the zoom box 352 moves to that location, and a new magnified image 358 of a new portion 359 of the image 230 in the zoom box 352 is displayed in the magnified image window 350. Referring to FIG. 6, illustration (b), when the customer 10 mouses over the view icon 310 (right side view), an image 410 appears in the large view section 232 without further selection of the view icon 310 by the customer 10 (e.g., no mouse click is required). When the customer 10 moves the mouse cursor from the view icon 310 to a position 360 on the image 410, the zoom box 352 appears and moves to that position, and a magnified image 362 of a portion 363 of the image 410 within the zoom box 352 is displayed in the magnified image window 350. Referring to FIG. 6, illustration (c), when the customer 10 next mouses over the view icon 312 (left side view), an image 412 appears in the large view section 232 without further selection of the view icon 312 by the customer 10. When the customer 10 moves the mouse cursor from view icon 312 to a position 364 on the image 412, the zoom box 352 appears and is moved to that location, and a magnified image 366 of a portion 367 of the image 412 within the zoom box 352 is displayed in the magnified image window 350. Similarly, according to some embodiments, as the customer 10 moves the mouse cursor across the view icons 302-314, the corresponding image 412 dynamically updates to show the view represented by the respective icon 302-314 that the mouse cursor is over at that time.

Also, the zoom box 352 and magnified image screen 350 also work with the color view feature discussed hereinbefore with FIG. 3. As discussed hereinbefore, when a color has been selected (clicked on), the large image 230 in the large image view section 232 is updated (and locked) to show the item in the selected color, and the view icons 300 update to show the image views in the selected color. The customer 10 can then mouse over the color-selected image and the zoom box 352 will appear, the magnified image section 350 will appear, and the customer 10 can view zoomed details of the color-selected image for the selected view in the selected color.

Furthermore, for any of the embodiments described herein whenever the screen is updated in response to a customer 10 action or selection/deselection, it may be updated such that a new window (or screen section) is displayed within a currently displayed HTML (Hyper Text Markup Language) page, web page, or browser screen (and, thus, no new HTML page, web page, or browser screen is generated). This is to be distinguished from other conventional techniques, where new HTML pages open up over an existing page when a feature, attribute, or icon is selected by the user.

Referring again to FIG. 3, as discussed hereinbefore, the slide show viewer (or slider) 202 may be used in the display screen 200 to allow the customer 10 to select items from the list 100 without having to leave the web page, as is described in detail in U.S. patent application Ser. No. 11/694,597, entitled "Method and System for Selecting and Displaying Items," which has the same filing date as U.S. patent application Ser. No. 11/694,726, and is incorporated herein by reference in its entirety.

In particular, the slider section 202 displays a series of eight adjacent thumbnail item images 140-154 in eight corresponding adjacent locations indicative of the first eight items 102-116 in the list 100 (FIG. 3), respectively. However, the slider 202 may display any number of images desired. Also, the slider may display images corresponding to any of the items on the list 100. In addition, there may be certain of the item details information 123 displayed with each of the item images 140-154. Further, the selected item 102 has a box 204 around it in the slider 202 to indicate it is selected.

If there are more than the predetermined maximum number of images, e.g., eight, in the slider 202 (e.g., there are more than eight recommended items in the list 100), left and right scroll arrow buttons 222,224, respectively, appear. The maximum number of images in the slider 202 may be any desired number, depending in part on the size of the images 140-154 and the size of the browser screen. When the customer 10 selects (clicks on or mouses over) the left scroll arrow button 222, the images 140-154 (and the associated item details 123) all scroll (or index or shift) to adjacent positions to the right. Similarly, if the customer 10 clicks on the right scroll button 224, the images 140-154 (together with the associated item summaries 123) all scroll (or index or move) to the adjacent positions to the left.

The scroll type for the slider 202 may be an index-type scroll, where there are preset positions for each image in the slider 202, or a smooth or continuous-type scroll, where there are no fixed positions for the images 140-154 in the slider 202, and the images 140-154 scroll smoothly as a group across the slider screen 202 in the desired direction based on the selection of the scroll buttons 222,224. Also, if there are more than the predetermined maximum number of images in the slider 202, a "search results" summary status 226 of which items are displayed in the slider 202 is provided.

Figure 7:
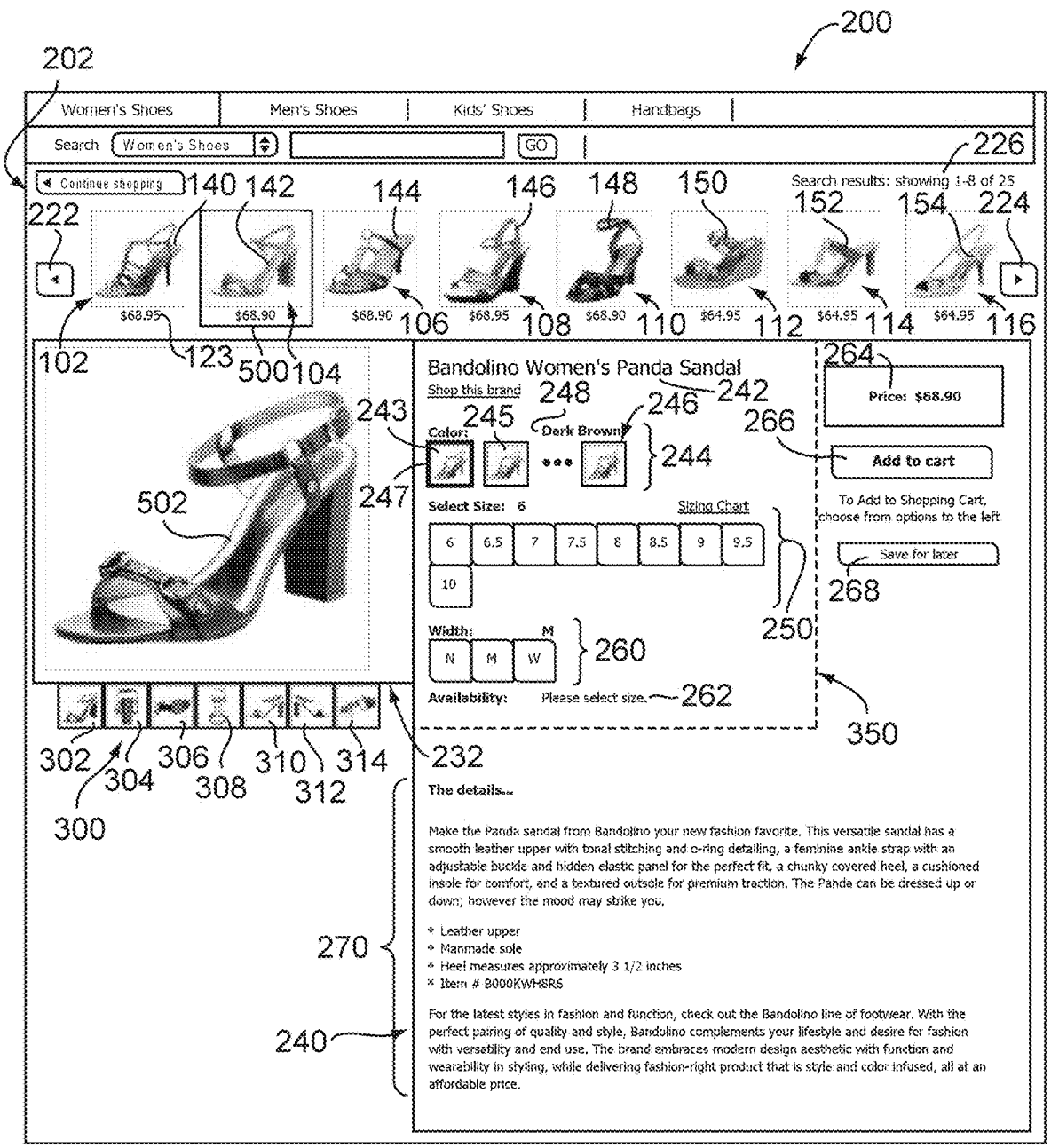
FIG. 7 is a screen illustration of another zoom detail window showing selection of another item, in accordance with embodiments of the present disclosure.

Referring to FIG. 7, when the customer desires to view another item 104 on the list 100, the customer 10 may go back to the screen 90 (FIG. 2) and select the item 104 from the list 100 which will bring the customer 10 to the screen 200. However, if the slider 202 is used, the customer 10 can click on a corresponding image 122 in the slider 202, causing the box 206 (FIG. 3) around the item 102 to disappear and a new box 500 to appear around the selected image 142. In either case, the large image view section 232 is updated to display a large image 502 of the newly selected item 104, and the view icons 300 are updated to show available views for the newly selected item 104. In addition, the item detail section 240 is updated to display details of the item 104. With the item 104 selected, the customer 10 may zoom in on the large image 502 or a large view corresponding to any of the icon views 300 for that item 104 as discussed hereinbefore with FIG. 5 for the item 102.

Figure 8:
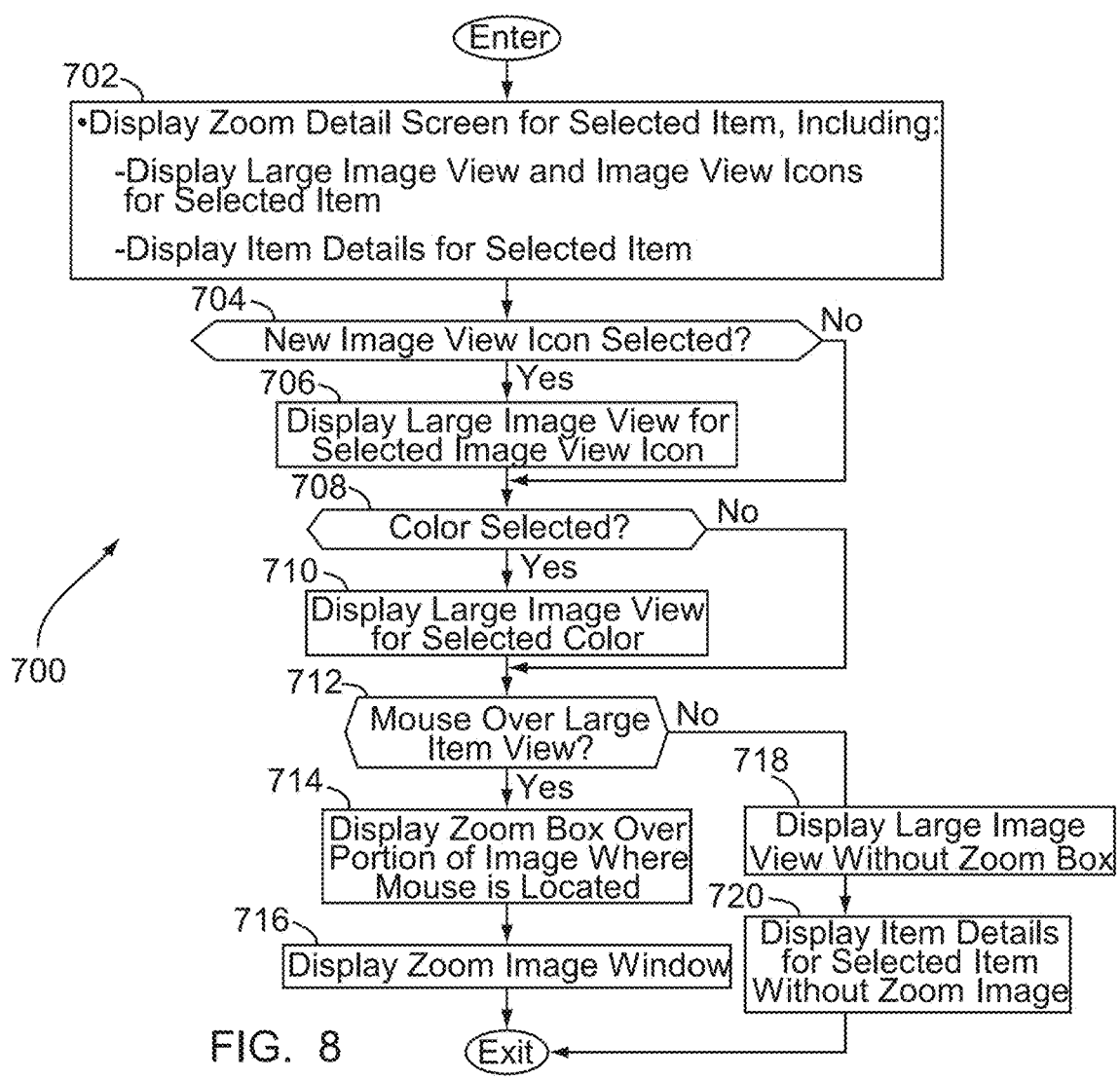
FIG. 8 is a flow chart of a zoom detail window display process, in accordance with embodiments of the present disclosure.

Referring to FIG. 8, a process 700 for providing the zoom detail window user interface disclosed herein begins at block 702, which displays the sections of the zoom detail window 200 for the selected item, including displaying the large image view section 232, displaying the view icons 300, and displaying the item details 240 for the selected item. Next, block 704 determines whether a new one of the view icon 300 has been selected. If YES, block 706 displays a large image for the selected image icon 300 in the large image view section 232. After the block 706 or if the result of the block 704 is NO, a step 708 determines if the customer 10 has selected one of the color icons 246 in the item details section 240. If YES, block 710 displays a large 230 image of the selected item in the large image view section 232 having the selected color. After the block 710 or if the result of block 708 is NO, block 712 determines if the customer 10 has moused over the large item view section 232. If YES, block 714 displays the zoom box 252 (FIG. 3) and a block 716 displays the magnified image 254 in the zoom screen section 350 and then the process exits. If the result of the block 712 is NO, block 718 displays the large image view without the zoom box and block 720 displays the portion of the full item details section without the magnified image window 350.

It should be understood that the screen 200 may be reached by selecting on any item or image on the merchant web site that would bring the customer 10 to an item (or product) details page. Thus, the item need not be selected from a list (or group, or set, or collection), but may be a stand alone item on the merchant web site.

It should be understood that it is not important for the present disclosure how the customer 10 actually purchases or otherwise obtain the desired item. For example, the desired item may be obtained by the customer 10 using the computer 14 and the network 18 or off-line without the use of the computer 14 or network 18, e.g., via telephone, fax, mail, in person, CD, or DVD, or the like.

Although the disclosure has been described herein using exemplary techniques, algorithms, and/or processes for implementing the present disclosure, it should be understood by those skilled in the art that other techniques, algorithms and processes or other combinations and sequences of the techniques, algorithms and processes described herein may be used or performed that achieve the same function(s) and/or result(s) described herein and which are included within the scope of the present disclosure.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the systems and methods described herein in which functions may be deleted or executed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

Figure 10:
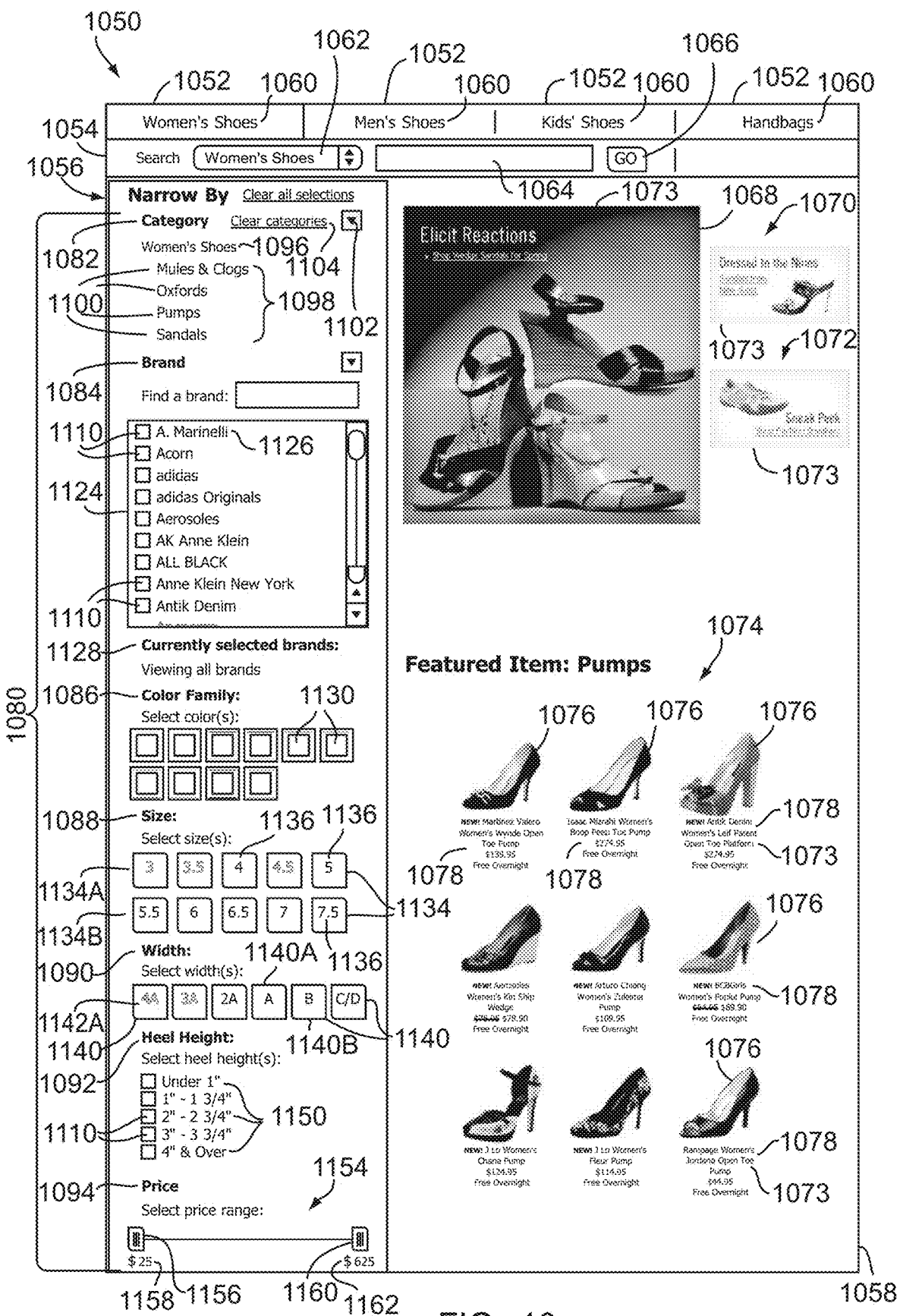
FIG. 10 is an illustration of one embodiment of a product selection screen in accordance with the present disclosure.

Referring to FIG. 10, one embodiment of a graphical user interface (GUI) for use by the customer 10 in selecting products for purchase from the merchant 20 via the web site 22 includes a product selection screen 1050. Generally, the product selection screen 1050 includes a plurality of product buttons 1052 which identify various types of products offered for sale on the web site 22, a product search bar 1054, a filter window 1056 and a display window 1058. In the FIG. 10 embodiment, the filter window 1056 and display window 1058 are separate windows, however, in other embodiments of the present invention, the filter window and display window can be displayed in a common window. Also, in the illustrated embodiment, the products featured on the website 1022 and discussed with respect to the product selection screen 1050 are women's shoes. However, the scope of the disclosure is not limited in this regard as the system and method of the present disclosure can be utilized in connection with the marketing and sales of many other types of products as will be readily apparent to one skilled in the art.

The product buttons 1052 each include the name or other indicia 1060 identifying a type of product offered for sale on the website 1022. As shown in the FIG. 10 embodiment, the product buttons 1052 include the names "Women's Shoes", "Men's Shoes", and "Kids' Shoes" respectively, which provide the indicia 1060 thereon. The product buttons 1052 are selectable by the customer 10 via a mouse click for displaying products of the designated type on product selection screens linked to the respective product buttons 1052 which are similar to the product selection screen 1050 featuring women's shoes.

The search bar 1054 includes a pull-down menu 1062 and text box 1064 whereby the customer 10 can search the website 1022 for the products offered thereon. Typically, the website 1022 is searched for the type of product selected in the pull-down menu 1062 based on specific features of a sought-after product identified using key words entered in the text box 1064 by the customer 10 via the computer 14. A "GO" button 1066 is selectable via a mouse click to initiate the search once the key words have been entered. Although not shown in FIG. 10, the pull-down menu 1062 identifies selectable product identifiers corresponding to each of the product types included in the product buttons 1052. Additionally, the pull-down menu 1062 may include selectable product identifiers corresponding to various subsets of the products offered on the website 1022 including "Sale" or "Clearance" products, as well as various holiday-related products, and other groups of products.

In a normal state, prior to a user-initiated search and/or product selection, the display window 1058 includes a plurality of advertisement displays (1068, 1070, 1072, 1074) wherein certain products or product types are featured via images and/or text. Typically, each advertisement display (1068, 1070, 1072, 1074) includes a link 1073 to an address (URL) of a page of the website 1022 featuring the advertised products.

The advertisement display 1074, which is directed to a currently featured item, namely "Pumps" (FIG. 10) includes a plurality of product images 1076 and associated product descriptions 1078 of various styles of "Pumps" offered for sale on the website 1022. Each of the product descriptions 1078 typically defines a link 1073 to the address (URL) of a page of the website 1022 directed to the advertised product. The links 1073 are normally identifiable via underlined or otherwise highlighted text or images either in a normal view of the advertisement display 1074 or when a cursor (not shown) is pointed to or positioned adjacent a selected product image 1076 or product description 1078.

Apart from the normal state, the display window 1058 is dynamic and updated in real time in response to a product or brand selection, or a search criteria entry initiated by the customer 10. The display window 1058 and features thereof are discussed further herein following.

Still referring to FIG. 10, the filter window 1056 includes a plurality of user interfaces including product selection tools 1080 wherein a customer 10 can select and/or input search criteria or features related to a product or product type for narrowing a search of the products available for sale on the website 1022. In the illustrated embodiment, the product selection tools 1080 include: a category menu 1082; a brand menu 1084; a color family table 1086; a size table 1088; a width table 1090; a heel height table 1092; and a price range selector 1094. In other embodiments of the product selection screen 1050, the filter window 1056 may include other search or sorting tools which are directed to features of a particular product or product type selected.

The interactive interfaces for the color, size and width attributes described herein are similar to that described in co-pending U.S. patent application Ser. No. 11/619,998 filed Dec. 29, 2006, entitled "Method and Systems for Selecting Item Variations for Display in User Interfaces," which is incorporated herein by reference in its entirety.

The category menu 1082 includes a product type identifier 1096 which displays the name corresponding to the type of product selected in the pull-down menu 1062 and/or via the product buttons 1052. Following the product type identifier 1096, the category menu 1082 includes an alphabetically arranged category list 1098 of selectable category identifiers 1100 corresponding to the designated product type. The category identifiers 1100 are selectable individually via a mouse click whereby all products available on the website 1022 in the selected category are displayed in the display window 1058. A user-operable category display button 1102 is provided to turn on/off the display of the category list 1098. The category menu 1082 also includes a "clear category" selector 1104 which clears all selected category identifiers 1100 upon operation thereof.

In some embodiments of the present disclosure, the various category identifiers 1100 are selectable separately such that the display window 1058 provides a product image 1076 and/or product description 1078 for each of the products available on the website 1022 in the identified category. Alternatively, the various category identifiers 1100 can be selected in combination, wherein more than one of the category identifiers 1100 are selectable such that the display window 1058 includes a product image 1076 and/or product description 1078 for each of the products available on the website 1022 in each of the categories selected. According to some embodiments, unless sorted otherwise, the product images 1076 and/or product descriptions 1078 for a next category are displayed on the display window 1058 in one or more horizontal rows following one or more horizontal rows of product images 1076 and product descriptions 1078 of the products in a prior category wherein the categories are displayed in the order they appear in the category list 1098.

Figure 11:
FIG. 11 is an illustration of another embodiment of a product selection screen in accordance with the present disclosure illustrating the display of a selected category of products available for purchase.

Referring to FIG. 11, upon selection of a category identifier 1100 (e.g., Mules & Clogs) both of the filter window 1056 and display window 1058 of FIG. 10 are updated in real time to reflect the current selections. For example, in the FIG. 11 embodiment, each of the filter window 1056A and display window 1058A have been updated to reflect the category selected, namely "Mules & Clogs". Upon selection of the Mules & Clogs category identifier, the server 1024 accesses a product database on the merchant server for women's shoes that are available for purchase from the merchant website 1022 and sorts the same returning only those women's shoes which are classifiable as either mules or clogs.

The updated display window 1058A includes a product image 1076 and product description 1078 for each of the shoes identified in the search including all women's shoes included on the website 1022 which are classifiable as a "mule" or "clog". The display window 1058A also provides a sort bar 1112 including a pull-down menu 1114 whereby a customer 10 can select the order in which the displayed products are arranged. For example, in one embodiment, the pull-down menu 1114 includes the selections: "Featured", "Best selling", Newest arrivals", "Price: high to low", and "Price: low to high." Thus, the displayed results can be arranged in a customer defined order directly from the display window 1058A using the sort bar 1112.

Additionally, the display window 1058A includes a filter bar 1116 wherein a customer 10 can limit the results displayed by selecting a sort button such as "show only—sale items" button 1118 or "show only—newest arrivals" at button 1120 directly from the display window 1058A. In other embodiments of the display window 1058A, the filter bar 1116 can include sort buttons for other sort criteria wherein a customer 10 can limit the results to those products he/she is most interested in viewing.

As set forth above, the display window 1058A is dynamic and updated in real time upon a user selection of one of the product search tools 1080 disposed in the filter window 1056A as well as any of the sort or filter controls provided in the display window 1058A. For example, upon selection of the "Best selling" selection in the sort bar 1112, the display window 1058A is automatically updated to re-order the displayed shoes based on the number of pairs sold for each style of shoes in the selected group.

Still referring to FIG. 11, the updated filter window 1056A displays the product type identifier 1096, namely "Women's Shoes" as well as the selected category identifier 1100, namely, "Mules & Clogs." Additionally, a subcategory list 1106 is displayed including an alphabetical list of subcategory identifiers 1108. In the illustrated example, the subcategory identifiers 1108 describe various types of mules and clogs such as "casual mules", "dress mules", etc. Each of the subcategory identifiers 1108 includes an associated selection box 1110 disposed adjacent thereto. The subcategory identifiers 1108 are each user-selectable via a mouse click using the associated selection box 1110 or by designating a selected one of the subcategory identifiers 1108 using a mouse pointer (not shown) and subsequent mouse click via the computer 14 as is well known in the art. One or more of the subcategory identifiers 1108 are selectable for displaying only the women's shoes in the selected subcategories in the display window 1058A. Upon selection of a subcategory identifier 1108, the filter window 1056A and display window 1058A are updated in real time to reflect the selections made.

Still referring to FIG. 11, the brand menu 1084 identifies certain brand names 1126 shown in phantom or a lighter font such as the brand name 1126A, namely, "ALL BLACK" indicating the brand as not selectable since there are no "Mules & Clogs" available through the web site 22 sold under the brand name "ALL BLACK." Upon customer selection of any of the product attributes or features provided via the product selection tools 1080 to narrow a search of the products available through the web site 22, the remaining product search tools 1080 and sorting tools are similarly updated in accordance with the customer selection (s) and the products available. For example, if a customer 10, sets the price range selector 1094 to search for shoes having a maximum cost of $100, and all of the AK Anne Klein shoes available through the web site 22 have a retail or sale price more than $100, then the brand menu 1084 will be updated in real time in response to the customers price range selection, to display the brand name 1126 for "AK Anne Klein" in phantom or light font so that the customer 10 cannot select this brand and knows that AK Anne Klein brand shoes are not available for a cost of $100 or less. Additionally, the display window is also updated in real time to display only those shoes available through the web site 22 that have a retail or sale price of $100 or less. All of the remaining product selection tools 1080 are similarly updated in accordance with the customer selection via the price range selector 1094 and any other customer selections.

Referring again to FIG. 10, the brand menu 1084 includes a brand name list 1124 including an alphabetical listing of each of the brand names 1126 of women's shoes available on the website 1022. A selection box 1110 disposed adjacent each brand name 1126 in the brand name list 1124 is selectable via a mouse click to identify the brands of shoes to be displayed in the display window 1058. Alternatively, using a mouse pointer (not shown) operable via the computer 14, the customer 10 can select a brand name 1126 included in the brand name list 1124 by directing the mouse directly on the brand name 1126 icon and clicking on the same. To deselect a selected brand name 1126, a second mouse click on the selection box 1110 or brand name 1126 icon will deselect the brand and cause the display window 1058 and filter window 1056 to be updated accordingly.

Additionally, the brand menu includes a selected brands list 1128 which displays an alphabetically arranged list of those brand names 1126 which have been selected and currently displayed. As shown in FIG. 10, the selected brands list 1128 displays the terms "Viewing all brands" as no brand names 1126 have been selected.

Upon selection of a brand name 1126 to be displayed, both the filter window 1056 and display window 1058 are updated in real time to reflect the customer selections made via one of the search tools 1080 or the sort tools provided in the display window 1058. For example, if a user selects the brand "adidas" for the product type "Women's shoes" and no other search criteria has been entered, the server 1024 controls the display window 1058 to display all styles of women's shoes which carry the Adidas® label and are available on the website 1022. The selected brand list 1128 would also be updated simultaneously with the filter window 1056 to identify only the selected brand Adidas®.

One convenient feature of the brand menu 1084 is that a customer 10 can select more than one brand name 1126 whereby only the selected brands of shoes are displayed simultaneously in the display window 1058 and the corresponding products comparable via the display window. For example, if a customer 10 is interested in shoes of only certain brands such as "A. Marinelli" and "AK Anne Klein", then the brand name 1126 corresponding to each of these brands can be selected in the brand menu 1084 and the designated products viewed simultaneously in the display window 1058. The displayed product images 1076 and associated product descriptions 1078 can be arranged in accordance with the various product search tools 1080 and/or other sort tools available via the display window 1058.

Figure 13:
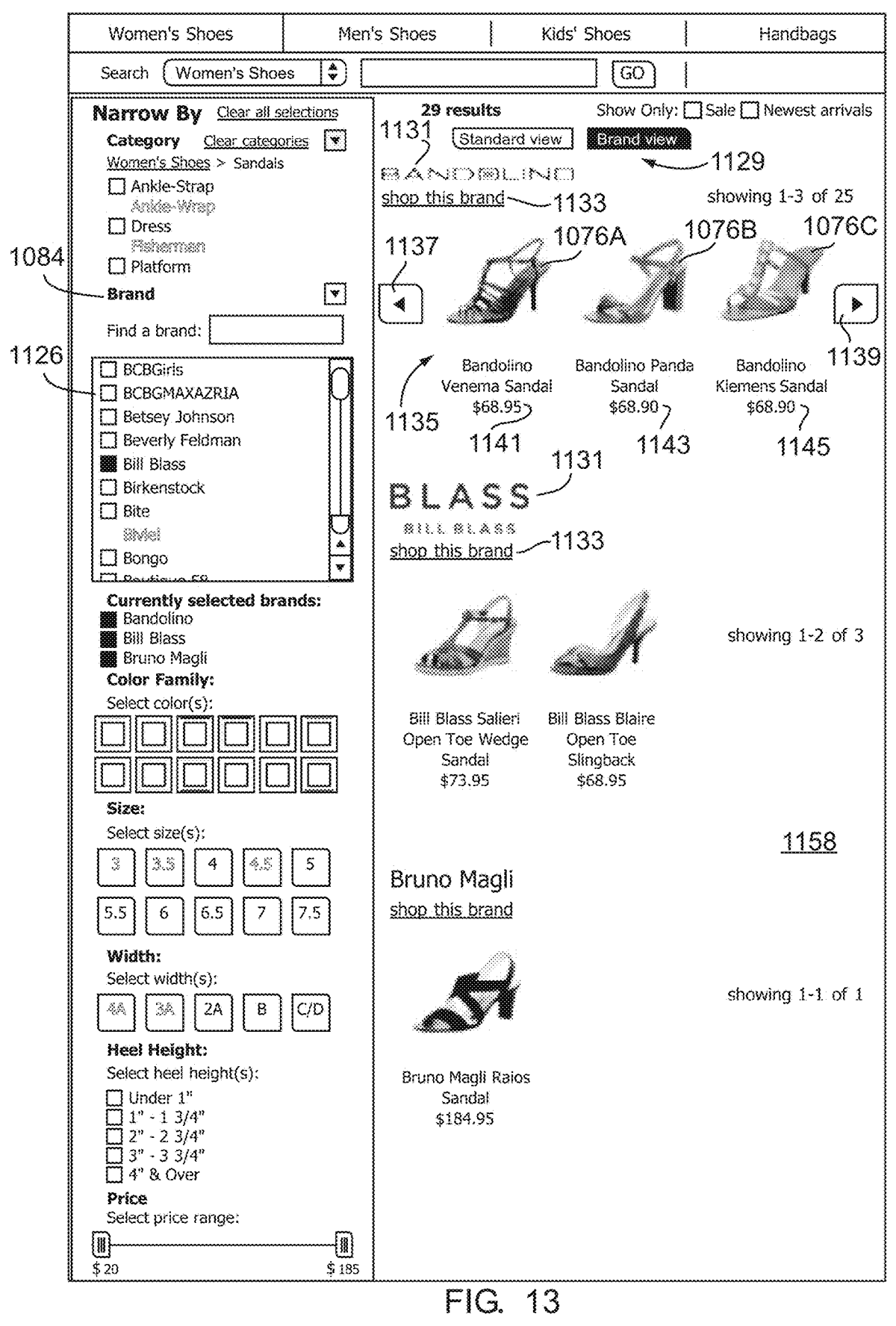

Referring to FIG. 13, upon selection of one or more brand names 1126 via the brand menu 1084 the display window 1058 is updated to include a standard view/brand view toggle 1129 whereby the display window can be switched via a mouse click by the customer 10 between a standard view and a brand view. In the brand view, as shown in FIG. 13, the product images 1076 and product descriptions 1078 are arranged in the display window 1058 sorted by the brand names 1126. Whereas, in the standard view (See FIG. 10) all of the selected product images 1076 and associated product descriptions 1078 are grouped together, regardless of the brand. A brand logo 1131 is also displayed above the product images 1076 corresponding to each of the displayed brands. Also included in the display window 1058 near each brand logo 1131 is an associated "shop this brand" icon 1133 which is user selectable to update the display window 1058 to display only products of the selected brand name 1126. Thus, selection of one of the "shop this brand" icons 1133 causes the brand menu 1084 to clear all selected brand names 1126 except the brand name corresponding to the selected "shop this brand" icon. Accordingly, the filter window 1056 and display window 1058 are refreshed and updated in real time to reflect the revised brand name selection.

Still referring to FIG. 13, if there are more than a predetermined maximum number of images in a selected portion of the available products to be displayed, e.g., three, in the viewer 1135 (e.g., there are more than three products identified in the Bandolino® brand), left and right scroll buttons 1137, 1139, respectively, are displayed in the display window 1058 for customer operation of the viewer 1135. The maximum number of images in the viewer 1135 may be any desired number, depending in part on the size of the product images 1076. For example, when the customer 10 selects (clicks on) the right scroll button 1139, the images 1076A-1076C would normally scroll (or index or shift) to adjacent positions to the right, e.g., the image 1076C disappears, the image 1076B moves to the position 1143 (previously occupied by image 1076C), the image 1076A moves to the position 1143, and a new image (not shown) appears in the position 1141. When the first of image (e.g., 1076A) of a resulting search is displayed in the first position 1141 of the viewer 1135, (as is the case in the illustrated example) the images 1076A-1076C do not move to the right, as the viewer 1135 includes the first image of the search results in the first viewer position, i.e. position 1141. Accordingly, the left scroll button 1139 appears in phantom and is not selectable in this position.

Similarly, if the customer 10 clicks on the left scroll button 1137, the images 1076A-1076C all scroll (or index) to the adjacent positions to the left, i.e., the image 1076A disappears, the image 1076B moves to the position 1141 (previously occupied by the image 1076A), the image 1076C moves to the position 1143, and a new image (not shown), indicative of the next product in the results list (i.e. product no. 4 of 25), appears in the position 1145. When the last item on the list is displayed in the last position 1145 of the viewer 1135, the images 1076A-1076C do not move to the left, as the viewer 1135 is at the bottom of the list. Instead of an index-type scroll described above where there are preset positions for each image, a smooth or continuous scroll may be used, in which case there are no fixed positions for the images 1076A-1076 C in the viewer 1135 and the images 1076A-1076C scroll continuously across the viewer window 1135 in the desired direction based on the selection of the scroll buttons 1137, 1139.

Referring again to FIG. 10, the color family table 1086 provides a plurality of individually selectable color icons 1130 each bearing a color representative of a color of a women's shoe available via the website 1022. Thus, the color family table 1086 provides one of the product search tools 1080 whereby the products available on the website 1022 can be searched by color. Multiple color icons 1130 represent various multi-colored and color combinations of products available. Each of the color icons 1130 is selectable for displaying the available products of the selected color or multi-color via the display window 1058. One or more of the color icons 1130 can be selected wherein the display window 1058 is updated to display all of the selected products available on the website 1022 which are of the colors selected via the color icons 1130. For example, if a customer 10 is only interested in brown or black shoes, then the color icons 1130 corresponding to both brown and black can be selected whereby the display window 1058 is updated in real time to display only shoes which are brown and black and meet any other criteria identified in conjunction with the other product search tools 1080 and/or the sort tools provided via the display window.

As shown in FIG. 11, the color family table 1086 interacts in real time with the other product search tools 1080 and sort tools available via the display window 1058. Thus, once other search criteria have been selected, the color family table 1086 is updated in the filter window 1056 to reflect the colors of shoes available corresponding to any customer selections or sort criteria entered. For example, as shown in FIG. 11, the second row of color icons 1130 identified in the color family table 1086A with the reference numeral 1132 each include only a portion of a color block indicating that the corresponding colors are unavailable in the selected category, namely, Mules & Clogs. In other embodiments of the color family table 1086, the colors icons 1130 can be identified in various other ways to indicate whether or not a corresponding color is available in the selected products. For example, the color icon 1130 identifying a color not available in a selected product could be displayed with an X superimposed over the image of the color icon.

Referring again to FIG. 10, the size table 1088 includes a plurality of size icons 1134 each including a reference number indicative of a shoe size 1136. The size icons 1134 are selectable individually or in any combination thereof to limit the products displayed on the display window 1058 to those products available in at least one of the selected shoe sizes. The size icons 1134 include an identifier to indicate the corresponding shoe size is unavailable via the website 1022. For example, as shown in FIG. 10, the size icon 1134A includes a shoe size "3" displayed in a different font than the shoe size "5.5" disposed in the size icon 1134B indicating the shoe size 3 is not available in the selected style(s) of shoes. Whereas the selected shoes are available in the shoe size 5.5. In other embodiments of the size table 1088, other means of identifying whether or not certain sizes of shoes are available in a selected style can be utilized including, for example, wherein the colors of the shoe sizes and/or size icons for the shoe sizes available versus unavailable are distinguishable therebetween.

Referring again to FIG. 10, the filter window 1056 also provides a width table 1090 which includes a plurality of width icons 1140 each including a width identifier 1142. The width icons 1140 are individually selectable by a customer 10 via a mouse click to limit the products displayed in the display window 1058 to those which are available in at least one of the widths selected in the width table 1090. Upon selection of one or more of the width icons 1140, the display window 1058 is automatically updated in real time to display only the products of the selected styles which are available in widths corresponding to any selected width icons 1140. Upon selection of a width icon 1140 the width table 1090 is updated to mark the selected width icon in some way such that the selected status thereof is distinguishable from an unselected width icon. A mouse click on a selected width icon 1140 will deselect the width icon causing the display window 1058 to be updated to reflect the revised width criteria selected. If none of the width icons 1140 are selected the display window 1058 will include all of the selected products available.

For example, if a customer 10 is only interested in shoes which are available in an "A" or "B" width, the width table 1090 can be utilized to select the width icons 1140A and 1140B corresponding to "A" and "B" widths respectively. Upon selection of the width icons 1140A and 1140B, the display window 1058 is automatically updated to display only those product images 1076 and associated product descriptions 1078 corresponding to the selected styles of shoes which are available in at least one of the widths "A" and "B." Once selected, the filter window 1056 is updated to display the selected width icons 1140A and 1140B including an outline or some type of highlighting or mark so that the selected status thereof is distinguishable from those width icons 1140 which have not been selected.

The width icons 1140 also provide an indicator as to the availability of the selected products in the associated widths. As shown in FIG. 10, the width identifier 1142A is shown in an outlined font indicating that the width "4A" is not available for the selected shoes and the associated width icon 1140 is not selectable. In other embodiments of the width table 1090, the entire width icon 1140 is displayed in phantom or a lighter grey tone indicating that the corresponding width is not available for the selected shoes. As set forth above, the width icon 1140 for unavailable widths is not selectable wherein a mouse click thereon will provide no result.

Still referring to FIG. 10, the heel height table 1092 allows a customer 10 to limit the shoes displayed on the display window 1058 to those having a heel height in one or more selected ranges. The heel height table 1092 includes a plurality of individually selectable range identifiers 1150 each having an associated selection box 1110 corresponding thereto. In one preferred embodiment the ranges of heel heights are selectable via a mouse click directly on a desired range identifier 1150 or by clicking the associated selection box 1110. In the illustrated example, the range identifiers 1150 include the following ranges of shoe widths: under 1"; 1"-1¾"; 2"-2¾"; 3"-3¾"; and 4" and over. Other ranges of shoe widths may be used.

Selection of one or more of the range identifiers 1150 or an associated selection box 1110 causes the display window 1058 to be updated in real time to limit the displayed shoes to those available having the selected heel sizes. For example, if the range identifiers 1150 for the ranges under 1" and 1"-1¾" are selected then the display window 1058 will be updated in real time to display all of the selected shoes which are available having a heel height of 1¾" and under.

Still referring to FIG. 10, the price range selector 1094 includes a sliding scale 1154 having a minimum price slider 1156 and corresponding minimum price identifier 1158 as well as a maximum price slider 1160 and corresponding maximum price identifier 1162. The minimum and maximum price sliders 1156, 1160 are operable by a customer 10 via dragging the sliders with a mouse (not shown) coupled to the computer 14 to limit the shoes displayed on the display window 1058 to those in a selected price range. For example, to display in the display window 1058 only the selected shoes priced in a range between $50 and $150, a customer 10 moves the minimum price slider 1156 towards the right side of the filter window 1056 until the minimum price identifier 1158 is set to $50. Similarly, the maximum price slider is moved towards the left side of the filter window 1056 until the maximum price identifier is set to $150. Thus, as the minimum and maximum price sliders 1156 and 1160 are moved, the corresponding minimum and maximum price identifiers 1158, 1162 respectively are updated in real time. Additionally, in response to changing the price range selector 1094 as set forth above, the display window is also updated in real time to include a product image 1076 and/or product description 1078 for only the selected products within the price range selected via the price range selector 1094.

In the illustrated embodiment, the price range selector 1094 includes a minimum and maximum prices of $25 and $625 respectively indicative of the full range of price of all products currently displayed. Alternatively, the price range selector 1094 can be adjusted with respect to the predetermined minimum and maximum prices in accordance with the prices of the products offered on the website 1022.

The product search tools 1080 displayed in the filter window 1056 as well as the sort tools 1112 and filter 1116 disposed on the display window 1058A are interactive with each other such that the displays associated with each of the search and sort tools is updated in real time to reflect a selection made using any of the search or sort tools.

Figure 12:
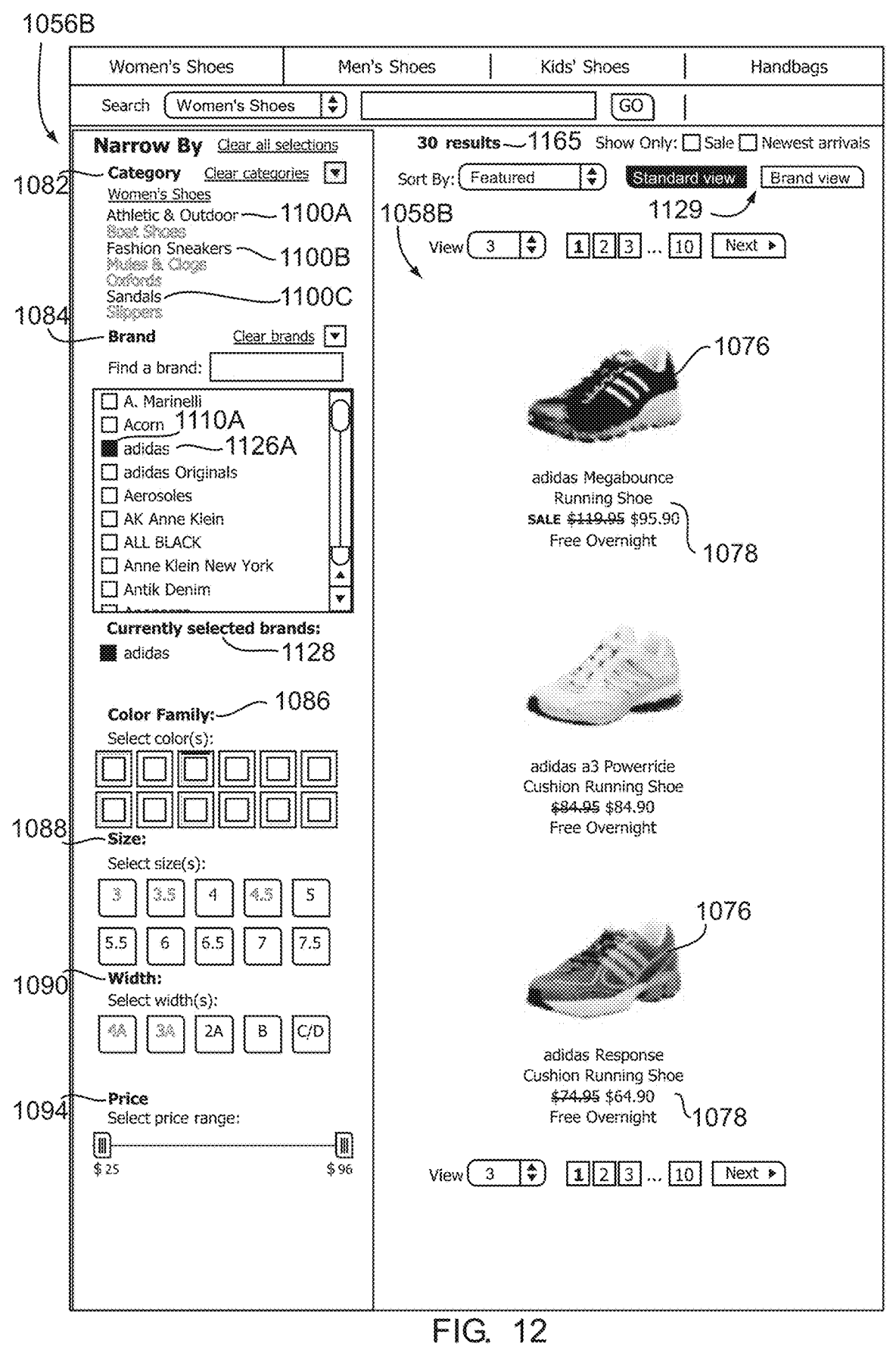

For example, as shown in FIG. 12, if a customer selects the brand Adidas® in the brand menu 1084, the product search tools 1080 in the filter window 1056B are updated in real time as follows:

The category menu 1082 is updated to identify in bold only those categories in which Adidas® brand shoes are available on the website 1022 (e.g., The category identifiers 1110A: Athletic & Outdoor; 1100B: Fashion Sneakers; and 1100C: Sandals; are each displayed in bold type). The remaining category identifiers are displayed in phantom or light text. Further, only the highlighted categories are user-selectable to further limit the products displayed on the display window 1058B.

The brand menu 1084 is updated to identify in bold type only the brand name 1126A identifying the selected Adidas® brand. The selection box 1110A associated with the Adidas® brand is marked.

The selected brands list 1128 is updated to include only the selected brand name, namely Adidas®.

The color family table 1086 is updated to identify the colors of the Adidas® brand shoes available through the website 1022.

The size table 1088 is updated to identify the sizes of the Adidas® brand shoes available through the website 1022.

The width table 1090 is updated to identify the widths of the Adidas® brand shoes available through the website 1022.

The heel height table 1092 is deleted from the filter window 1056 as heel height is not applicable to any of the selected Adidas® brand shoes available through the website 1022.

The price range selector 1094 is updated to identify the minimum and maximum prices of all of the Adidas® brand shoes available through the website 1022.

Still referring to FIG. 12, the display window 1058B is also updated in real time to reflect the selection of the Adidas® brand in the filter window 1056 including:

Updating the display window 1058B to include the product image 1076 and product description 1078 of each style of Adidas® brand shoes available through the website 1022.

Updating a results identifier 1165 to indicate how many styles of Adidas® brand shoes are available through the website 1022.

Displaying the standard/brand view toggle 1129.

Accordingly, each time one of the product selection tools 1080 or another sort tool is utilized by a customer 10 to initiate or narrow a product search, both of the filter window 1056 and display window 1058 are updated in real time to reflect the current search or sort criteria entered. There is no required order of use of the product selection tools 1080. For example, upon viewing the product selection screen 1050, a customer 10 can immediately utilize the brand menu 1084 to select one or more brand of shoes he/she is interested in viewing and/or purchasing. In response, the filter window 1056 is updated in real time to identify those brands selected; all other brand names are displayed in phantom or a lighter font such that the brands appear unselected. Additionally, each of the other product selection tools 1080 which have not been set by a customer 10 are also updated in accordance with the brands selected; e.g., the category menu 1082 is updated to identify only those categories of shoes available in the selected brands; the color family selector 1086 is updated to identify only those colors of shoes available in the selected brands. (Thus, if the manufacturers of the selected brands do not make white shoes, the color icon 1130 identifying the color white will be displayed as not selectable thereby indicating that white shoes are not available.) On the other hand, if the price range selector 1094 has already been set to identify a certain price range by the customer 10, then the price range selector 1094 will not be reset pursuant to the subsequent brand menu 1084 selections but will remain and limit the brand search to display only shoes in the selected brands within the pre-selected price range.

Figure 16:
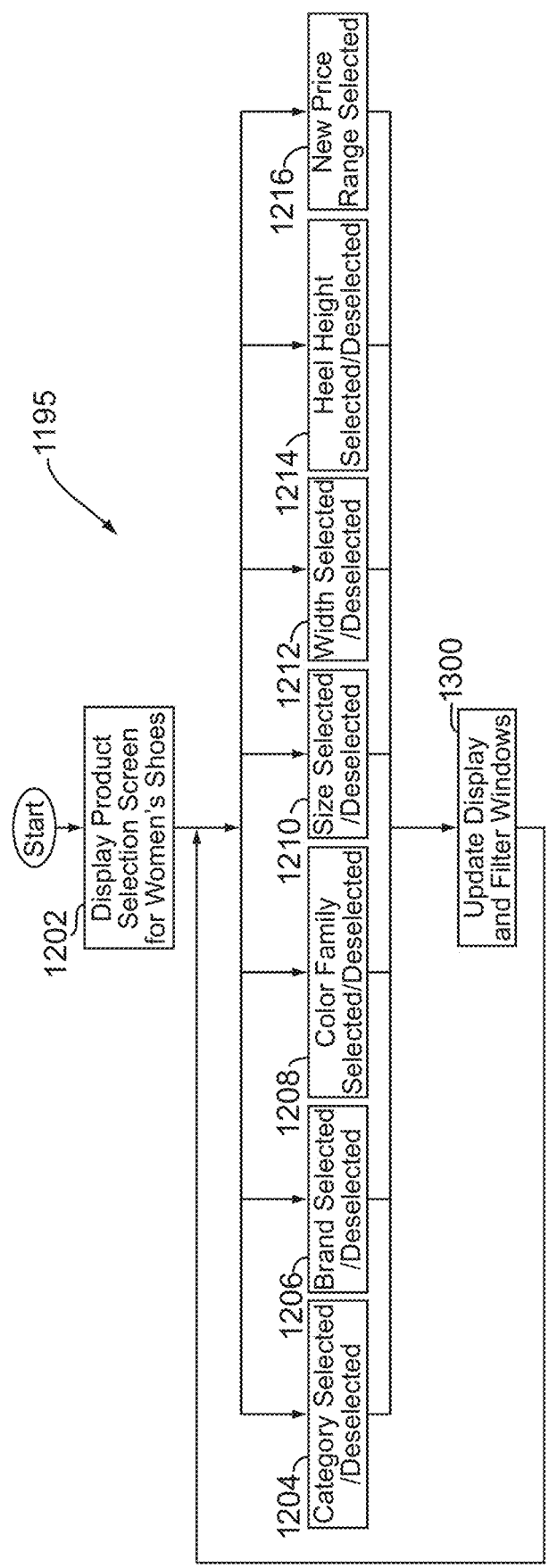
FIG. 16 is a flow chart of another embodiment of a process for displaying a plurality of products for customer review and comparison in accordance with the system and method of the present disclosure.

Referring to FIG. 16, a flow chart 1195 illustrates one embodiment of a process for displaying a plurality of products for customer review and comparison in accordance with the system and method of the present invention. The process begins at block 1202 wherein a product selection screen 1050 (See FIG. 10) including a filter window 1056 and display window 1058 for a selected product such as women's shoes is displayed. In a normal state, prior to any customer 10 use of the product selection tools 1080 or product sort tools, the process includes displaying a filter window 1056 directed to a "home page" for women's shoes and a display window 1058 displaying local advertisements 1073 and featured products 1074. The process continues at one of blocks 1204, 1206, 1208, 1210, 1212, 1214, 1216, with the customer 10 selection/deselection of one of a Category, Brand, Color Family, Size, Width Range, Heel Height, and Price Range, via one of the corresponding product selection tools 1080. Following use of one of the product selection tools 1080, the process continues at block 1300 wherein the filter window 1056 and display window 1058 is updated as discussed further herein below. Following updating of the filter window 1056 and display window 1058 at block 1300, the process loops and continues again at one of blocks 1204, 1206, 1208, 1210, 1212, 1214, 1216, pursuant to a next customer selection/deselection via one of the corresponding product selection tools 1080 as set forth above. As illustrated in FIG. 16, each of the product selection tools 1080 can be utilized by a customer 10 in any order with or without the use of another of the product selection tools.

The screens for both the filter window 1056 and display window 1058 are updated such that a new window (or screen section) is displayed within a currently displayed HTML page, web page or browser screen (and, thus, no new HTML page, web page, or browser screen is generated). Thus, each time one of the product selection tools 1080 or one of the sort tools provided in the display window 1058 is utilized by a customer 10, the filter window 1056 and display window 1058 is updated in response to the customer selection within the same browser screen or web page. This method is to be distinguished from other conventional techniques, where a new HTML page(s) is generated and opened over an existing page each time an icon, link or other selectable item is chosen by a user.

One key feature of the present disclosure is that many of the product selection tools 1080 allow a customer to choose more than one selection such that various products can be displayed simultaneously in a common display window 1058 for comparison therebetween. For example, using both the category menu 1082 and the brand menu 1084, a customer can select a category identifier 1100 for "Sandals" and brand names 1126 for the brand names "Bandolino" and "Anne Klein New York" which causes the display window 1058 to be updated in real time to display only the available products meeting these selected criteria. Thus, in this example, the display window 1058 is updated in real time to display only Sandals carrying the brand names "Bandolino" and "Anne Klein New York". As set forth above, the sort tools available directly from the display window 1058 allow the displayed product images 1076 and associated product descriptions 1078 to be grouped together in a standard view or sorted by brand and displayed in a brand view. The toggle 1129 being selectable to view the displayed products in either the standard or brand views.

While the product selection tools 1080 and other sort tools described herein illustrate some of the product selection methods that may be implemented with the present disclosure, it should be understood that many other or different selection and sort tools and/or selection or sort criteria may be used for and/or with the present disclosure.

Figure 14:
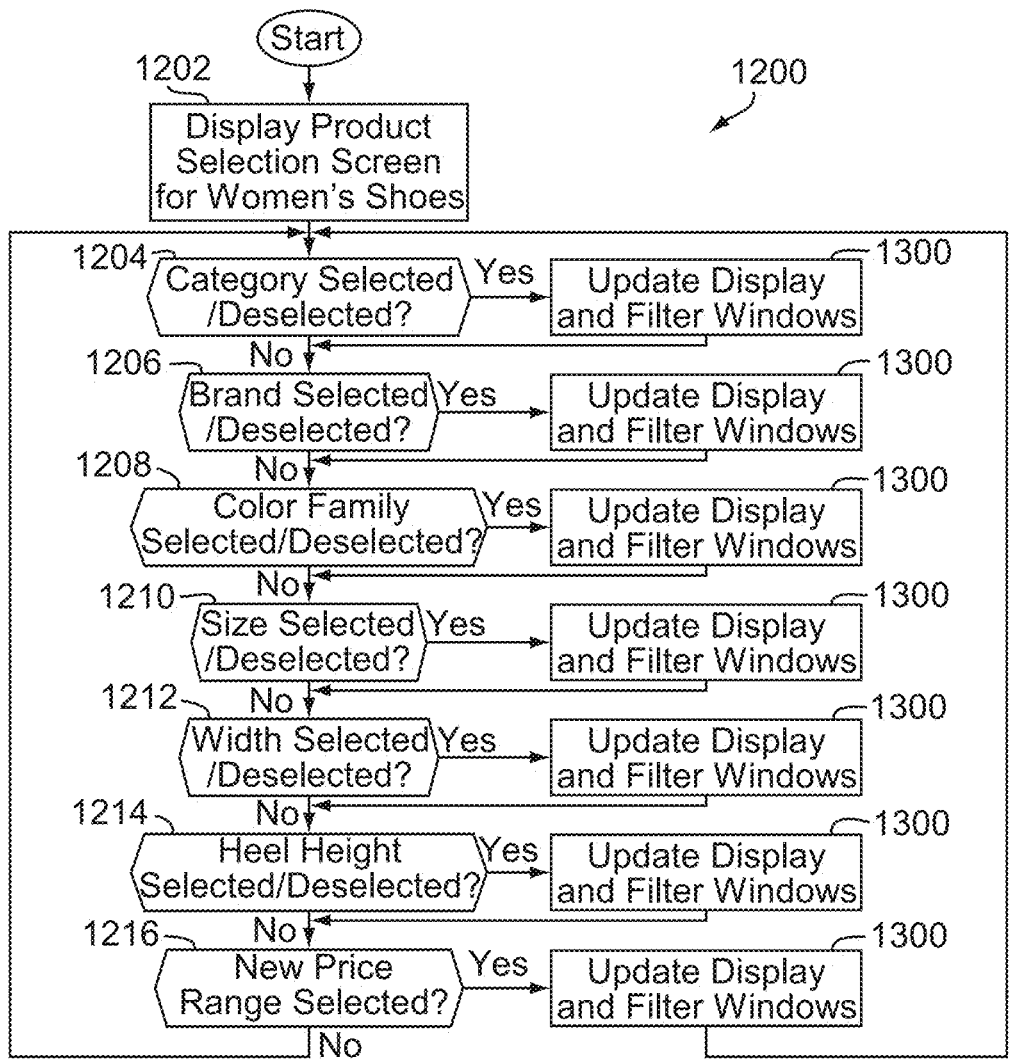
FIG. 14 is a flow chart of one embodiment of a process for displaying a plurality of products for customer review and comparison in accordance with the system and method of the present disclosure.

Referring to FIG. 14, a flow chart 1200 illustrates another embodiment of a process for displaying a plurality of products for customer review and comparison in accordance with the system and method of the present disclosure. The process begins at a block 1202 by displaying a product selection screen 1050 (See FIG. 10) including a filter window 1056 and display window 1058 for a selected product such as women's shoes. In a normal state, prior to any customer use of the product selection or sort tools, the process includes displaying a filter window 1056 directed to a "home page" women's shoes and a display window 1058 displaying local advertisements 1073 and featured products 1074. The process continues at block 1204 wherein a determination is made as to whether or not a category identifier 1100 or new category identifier has been selected or deselected. If yes the process proceeds to block 1300 wherein the display and filter windows are updated as discussed further herein below.

If no category identifier 1100 has been selected/deselected or following the updating of the display and filter windows pursuant to a category selection, the process continues at block 1206 wherein a determination is made as to whether or not a brand name(s) 1126 or new brand name(s) has been selected or deselected. If yes the process proceeds to block 1300 wherein the display and filter windows are updated according to the brand name selections made.

If no brand name 1126 has been selected/deselected or following the updating of the display and filter windows pursuant to a brand name selection, the process continues at block 1208 wherein a determination is made as to whether or not a color icon 1130 has been selected or deselected. If a color icon 1130 has been selected the process proceeds to block 1300 wherein the display and filter windows are updated according to any color selections made. Thereafter, the process continues at block 1210.

If no color icon 1130 has been selected/deselected or following the updating of the display and filter windows pursuant to a color selection, the process continues at block 1210 wherein a determination is made as to whether or not a size icon 1134 has been selected or deselected. If yes the process proceeds to block 1300 wherein the display and filter windows are updated according to any size selections made. Thereafter, the process continues at block 1212.

If no size icon 1134 has been selected/deselected or following the updating of the display and filter windows pursuant to a size selection, the process continues at block 1212 wherein a determination is made as to whether or not a width icon 1140 has been selected or deselected. If yes the process proceeds to block 1300 wherein the display and filter windows are updated according to any width selections made. Thereafter, the process continues at block 1214.

If no width icon 1140 has been selected/deselected or following the updating of the display and filter windows pursuant to a width selection, the process continues at block 1214 wherein a determination is made as to whether or not a heel height range identifier 1150 has been selected or deselected. If yes the process proceeds to block 1300 wherein the display and filter windows are updated according to any heel height ranges selected. Thereafter, the process continues at block 1216.

If no heel height range identifier 1150 has been selected/deselected or following the updating of the display and filter windows pursuant to a heel height selection, the process continues at block 1216 wherein a determination is made as to whether or not a price range or new price range has been selected via the price range selector 1094. If yes the process proceeds to block 1300 wherein the display and filter windows are updated according to the price range or new price range selected. Thereafter, the process loops to block 1204 and starts over checking each of the product selection tools 1080 for the current selections.

If no price range or new price range is selected, the process returns to block 1204 and starts over checking each of the product selection tools 1080 for the current selections.

Figure 15:
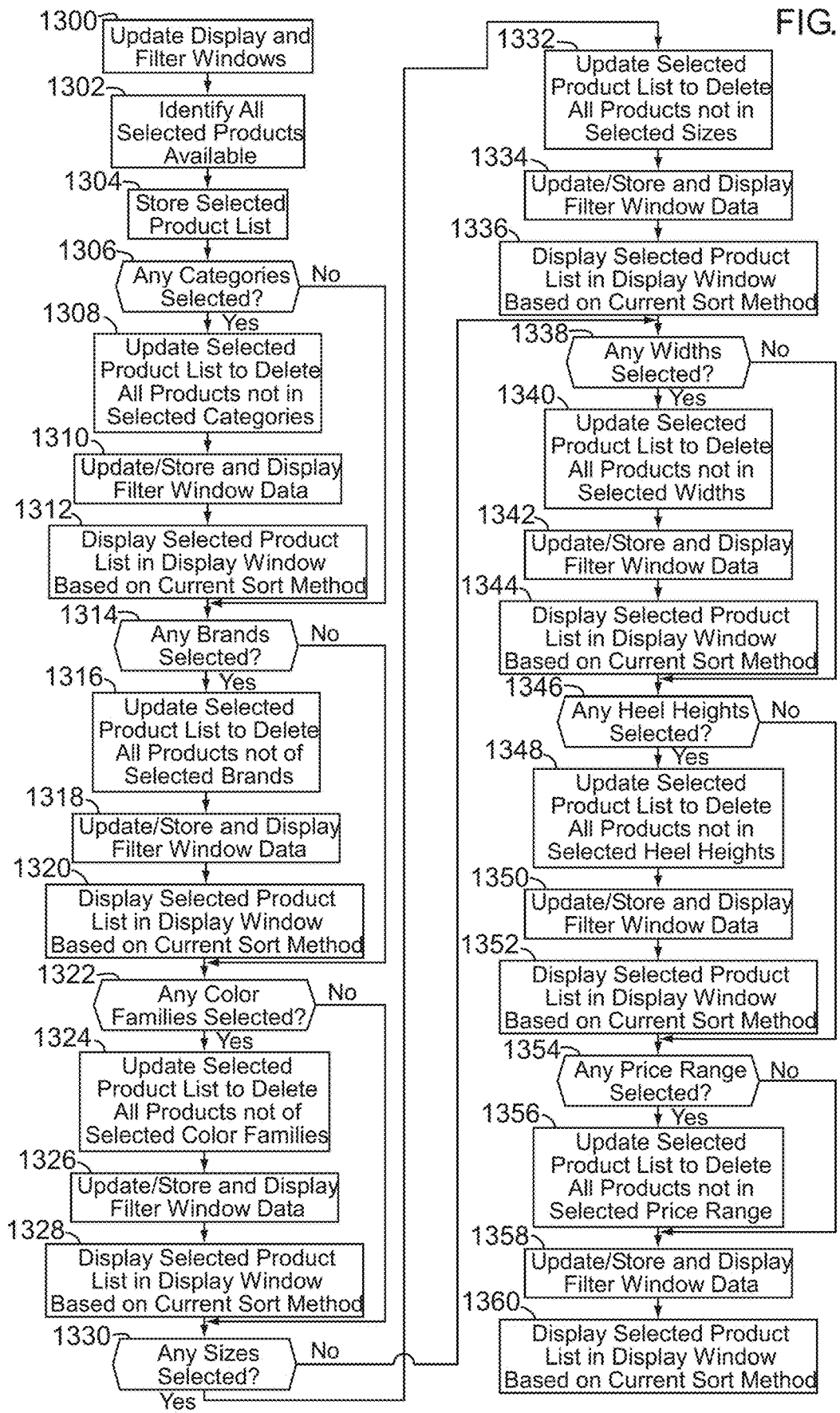
FIG. 15 is a flow chart of one embodiment of a process for updating a product display and filter windows in response to customer selection and sort requests according to the system and method of the present disclosure.

Referring to FIG. 15, the process of updating the display window 1058 and filter window 1056 begins at block 1300 and continues at block 1302 wherein a database associated with the merchant server 24 for the website 22 is queried and all products available through the website 22 of a customer selected product type are identified and stored in memory together with associated images and information for each product at block 1304. The information and images associated with each product currently selected is referred to herein collectively as "Selected Products Data."

The process continues at block 1306 wherein a determination is made as to whether or not a category identifier 1100 has been selected. If none of the category identifiers have been selected, the process jumps to box 1314. If one or more category identifiers 1100 have been selected the process continues at block 1308 wherein the Selected Products Data is retrieved and updated to delete therefrom all information related to products not in a selected category.

The process continues at block 1310 wherein the Selected Products Data is searched with respect to the features associated with each of the product search tools 1080 for updating the filter window 1056 with respect to the products selected. The information pertaining to the current products selected and associated with each of the product selection tools 1080 is collectively referred to herein as "Filter Window Data."

For example, if the currently selected products range in price from $35 to $350, the process at block 1310 includes scanning the Selected Products Data for the prices of each of the selected products and storing the minimum price retrieved ($35) and the maximum price retrieved ($350) as Filter Window Data and updating and displaying the price range selector 1094 accordingly. The same process is repeated for updating the Filter Window Data and displaying each of the product search tools 1080 provided in the filter window 1056 with respect to the products currently selected and the Selected Products Data therefor.

At block 1312, the process continues with sorting the Selected Products Data pursuant to any currently selected sort criteria such as "Price—low to high", "Bestselling" or "Newest arrivals" or by brand in a brand view. Still referring to block 1312, the process includes displaying the Selected Products Data including both a product image 1076 and associated product description 1078 for each currently selected product in accordance with the sorted order or arrangement thereof.

The process continues at block 1314 wherein a determination is made as to whether or not a brand name 1126 has been selected. If none of the brand name(s) 1126 have been selected, the process jumps to box 1322. If one or more brand names 1126 have been selected the process continues at block 1316 wherein the Selected Products Data is retrieved and updated to delete therefrom all information related to products not of a selected brand.

The process continues at block 1318 wherein the Selected Products Data is searched with respect to the features associated with each of the product search tools 1080 for updating the Filter Window Data with respect to the products selected and displaying each of the product search tools 1080 provided in the filter window 1056 with respect to the products currently selected and the corresponding Filter Window Data.

At block 1320, the process continues with sorting the Selected Products Data pursuant to any currently selected sort criteria. Still referring to block 1320, the process includes displaying the Selected Products Data including both a product image 1076 and associated product description 1078 for each currently selected product in accordance with the sorted order or arrangement thereof.

The process continues at block 1322 wherein a determination is made as to whether or not a color icon 1130 has been selected. If none of the color icons 1130 have been selected, the process jumps to box 1330. If one or more color icons 1130 have been selected the process continues at block 1324 wherein the Selected Products Data is retrieved and updated to delete therefrom all information related to products not of a selected color family.

The process continues at block 1326 wherein the Selected Products Data is searched with respect to the features associated with each of the product search tools 1080 for updating the Filter Window Data with respect to the products selected and displaying each of the product search tools 1080 provided in the filter window 1056 with respect to the products currently selected and the corresponding Filter Window Data.

At block 1328, the process continues with sorting the Selected Products Data pursuant to any currently selected sort criteria. Still referring to block 1328, the process includes displaying the Selected Products Data including both a product image 1076 and associated product description 1078 for each currently selected product in accordance with the sorted order or arrangement thereof.

The process continues at block 1330 wherein a determination is made as to whether or not a size icon 1134 has been selected. If none of the size icons 1134 have been selected, the process jumps to box 1338. If one or more color icons 1130 has been selected the process continues at block 1332 wherein the Selected Products Data is retrieved and updated to delete therefrom all information related to products not available in a selected size.

The process continues at block 1334 wherein the Selected Products Data is searched with respect to the features associated with each of the product search tools 1080 for updating the Filter Window Data with respect to the products selected and displaying each of the product search tools 1080 provided in the filter window 1056 with respect to the products currently selected and the corresponding Filter Window Data.

At block 1336, the process continues with sorting the Selected Products Data pursuant to any currently selected sort criteria. Still referring to block 1336, the process includes displaying the Selected Products Data including both a product image 1076 and associated product description 1078 for each currently selected product in accordance with the sorted order or arrangement thereof.

The process continues at block 1338 wherein a determination is made as to whether or not a width icon 1140 has been selected. If none of the width icons 1140 have been selected, the process jumps to box 1346. If one or more width icons 1140 have been selected the process continues at block 1340 wherein the Selected Products Data is retrieved and updated to delete therefrom all information related to products not available in a selected width.

The process continues at block 1342 wherein the Selected Products Data is searched with respect to the features associated with each of the product search tools 1080 for updating the Filter Window Data with respect to the products selected and displaying each of the product search tools 1080 provided in the filter window 1056 with respect to the products currently selected and the corresponding Filter Window Data.

At block 1344, the process continues with sorting the Selected Products Data pursuant to any currently selected sort criteria. Still referring to block 1344, the process includes displaying the Selected Products Data including both a product image 1076 and associated product description 1078 for each currently selected product in accordance with the sorted order or arrangement thereof.

The process continues at block 1346 wherein a determination is made as to whether or not a heel height range identifier 1150 has been selected. If none of the range identifiers 1150 have been selected, the process jumps to box 1354. If one or more range identifiers 1150 have been selected the process continues at block 1348 wherein the Selected Products Data is retrieved and updated to delete therefrom all information related to products not available within the selected heel height ranges.

The process continues at block 1350 wherein the Selected Products Data is searched with respect to the features associated with each of the product search tools 1080 for updating the Filter Window Data with respect to the products selected and displaying each of the product search tools 1080 provided in the filter window 1056 using the current Filter Window Data.

At block 1352, the process continues with sorting the Selected Products Data pursuant to any currently selected sort criteria. Still referring to block 1352, the process includes displaying the Selected Products Data including both a product image 1076 and associated product description 1078 for each currently selected product in accordance with the sorted order or arrangement thereof. The process continues at block 1354 wherein a determination is made as to whether or not the price range selector 1094 has been adjusted to specify a desired price range. If a price range has not been identified, the process jumps to box 1358. If a desired price range has been selected via the price range selector 1094, the process continues at block 1356 wherein the Selected Products Data is retrieved and updated to delete therefrom all information related to products not available within the selected price range.

The process continues at block 1358 wherein the Selected Products Data is searched with respect to the features associated with each of the product search tools 1080 for updating the Filter Window Data with respect to the products selected and displaying each of the product search tools 1080 provided in the filter window 1056 using the current Filter Window Data.

At block 1360, the process continues with sorting the Selected Products Data pursuant to any currently selected sort criteria. Still referring to block 1360, the process includes displaying the Selected Products Data including both a product image 1076 and associated product description 1078 for each currently selected product in accordance with the sorted order or arrangement thereof.

Thus, each time one of the product search tools 1080 or one of the sort tools provided is utilized by a customer 10 to revise the current search and/or sort criteria, the selected products are updated accordingly and displayed in the display window 1058 in real time. Additionally, the filter window 1056 setting forth the search criteria and the corresponding features of the currently selected products is updated and displayed in real time in response to any customer selections. The flow charts 1200 and 1300 identify one embodiment of a process in accordance with the present disclosure for displaying the filter window 1056 and display window 1058 pursuant to customer entered search and sort criteria.

What is claimed is:

1. A non-transitory computer-readable medium having computer-executable program code stored thereon,
    wherein the program code comprises:
    program code for causing a display of a first image section having dimensions $(X_1, Y_1)$ on a user interface, wherein the first image section includes a first image of a first view of an item, and wherein the first image has the dimensions $(X_1, Y_1)$;
    program code for causing a display of a second image section having dimensions $(X_3, Y_3)$ on the user interface, wherein the second image section includes at least a portion of a second image of the first view of the item, and wherein the second image has dimensions $(X_2, Y_2)$;
    program code for determining dimensions $(X_z, Y_z)$ according to the equations $X_z=X_1(X_3/X_2)$ and $Y_z=Y_1(Y_3/Y_2)$; and
    program code for causing a display of a box having the dimensions $(X_z, Y_z)$ disposed over at least a portion of the first image on the user interface in response to a mouse-over selection of the portion of the first image, and
    wherein at least the portion of the second image is larger than the portion of the first image.

2. The non-transitory computer-readable medium of claim 1, wherein the program code further comprises:
    program code for causing a display of a view icons section on the user interface,
    wherein the view icons section comprises a plurality of view icons,
    wherein individual ones of the plurality of view icons correspond to a plurality of views of the item, and
    wherein a first view icon of the plurality of view icons corresponds to the first view of the item.

3. The non-transitory computer-readable medium of claim 2, wherein the program code further comprises:
    program code for replacing the first image of the first view of the item in the first image section with a third image of a second view of the item in response to a selection of a second view icon of the plurality of view icons,
    wherein the second view icon corresponds to the second view of the item, and
    wherein the third image has the dimensions $(X_1, Y_1)$.

4. The non-transitory computer-readable medium of claim 3, wherein the selection of the second view icon is a mouse-over selection.

5. The non-transitory computer-readable medium of claim 3, wherein the program code further comprises:
    program code for replacing the second image in the second image section with a fourth image of the second view of the item, in response to the selection of the second view icon, and
    wherein the fourth image has the dimensions $(X_2, Y_2)$.

6. A computer-implemented method comprising:
    causing presentation of a first web page via a user interface, wherein the first web page comprises:
        an item collection section comprising a set of items presented in a spaced relationship, wherein the item collection section includes an item image, item name, and item price for individual ones of the items of the set; and
        a product selection tool section adjacent the item collection section, wherein the product selection tool section comprises a set of selectable features associated with at least one of the items of the set of items,
            wherein individual ones of the selectable features are associated with item characteristics, and
            wherein, in response to a selection of one of the selectable features, the set of items presented in the item collection section is narrowed to include items having the item characteristic associated with the one of the selectable features;
    receiving a selection of a first item of the set of items presented in the item collection section of the first web page;
    in response to receiving the selection of the first item,
        causing a first image of the first item to be downloaded, wherein the first downloaded image depicts the first item in a first view, and wherein the first downloaded image has width and height dimensions;
        causing a second image of the first item to be downloaded, wherein the second downloaded image depicts the first item in the first view, wherein the second downloaded image has width and height dimensions, and wherein the width and height dimensions of the second downloaded image are greater than the width and height dimensions of the first downloaded image;
    causing presentation of a second web page via the user interface, wherein the second web page comprises:
        an image view section comprising the first downloaded image of the item; and
        an item detail section adjacent the image view section, wherein the item detail section comprises a set of attribute selectors, a name of the first item, a price of the first item, and a narrative description section including a textual description of the first item;
    determining that a first location of a mouse cursor is over at least a first portion of the first downloaded image presented in the image view section at a first time;
    in response to determining that the first location of the mouse cursor is over at least the first portion of the first downloaded image presented in the image view section at the first time,
        causing presentation of an image overlay element over at least the first portion of the first downloaded image presented in the image view section to define an overlapping section, wherein the image overlay element has width and height dimensions and the first portion of the first downloaded image over which the image overlay element is presented is at least partially visible through the image overlay element; and
        causing presentation of a window element adjacent the image view section, wherein the window element has width and height dimensions,
            wherein the window element is presented over the item detail section so as to obscure at least a portion of the item detail section,
            wherein at least a first portion of the second downloaded image is visible via the window element and at least a second portion of the second downloaded image is not visible via the window element,
            wherein the width and height dimensions of the image overlay element are such that the overlapping section corresponds to the first portion of the second downloaded image that is visible via the window element,
wherein an aspect ratio of the image overlay element is equal to an aspect ratio of the window element,
wherein the width and height dimensions of the second downloaded image are greater than the width and height dimensions of the image overlay element, and
wherein the width and height dimensions of the window element are greater than the width and height dimensions of the image overlay element;
determining that a second location of the mouse cursor is not over any portion of the first downloaded image presented in the image view section at a second time, wherein the second time follows the first time; and
in response to determining that the second location of the mouse cursor is not over any portion of the first downloaded image of the first item presented in the image view section at the second time,
removing the image overlay element from the image view section; and
removing at least the window element from the second web page.

7. The computer-implemented method of claim 6, wherein the user interface is displayed by at least one computer device on at least one display, and
wherein causing presentation of the window element comprises:
determining a first anchor point within the first downloaded image presented in the image view section based at least in part on the first location of the cursor;
selecting a portion of the second downloaded image corresponding to the first anchor point; and
causing the presentation of the window element adjacent the image view section with the portion of the second downloaded image corresponding to the first anchor point.

8. The computer-implemented method of claim 7, wherein selecting the portion of the second downloaded image corresponding to the first anchor point comprises:
determining that a distance from the first anchor point to at least one edge of the first downloaded image is less than at least one of the width dimension of the image overlay element or the height dimension of the image overlay element; and
in response to determining that the distance from the first anchor point to the at least one edge of the first downloaded image is less than the at least one of the width dimension of the image overlay element or the height dimension of the image overlay element,
selecting the portion of the second downloaded image to include at least one edge of the second downloaded image corresponding to the at least one edge of the first downloaded image.

9. The computer-implemented method of claim 6, wherein the second web page further comprises a slider section comprising a plurality of thumbnail images,
wherein individual ones of the plurality of thumbnail images depict one of a plurality of items, and
wherein the first item is one of the plurality of items.

10. The computer-implemented method of claim 9, wherein an image of at least a second item of the plurality of items was presented in the image view section prior to the first time.

11. The computer-implemented method of claim 6, wherein
the item detail section further comprises a plurality of color icons,
wherein individual ones of the plurality of color icons correspond to one of a plurality of colors,
wherein the first downloaded image and the second downloaded image depicts the first item in a first color,
wherein a first color icon corresponding to the first color is displayed with at least one of a first shading or a first outline at the first time,
wherein the individual ones of the plurality of color icons other than the first color icon are displayed without the first shading or without the first outline at the first time, and
wherein the computer-implemented method further comprises:
receiving a selection of a second color icon at a third time, wherein the second color icon is one of the plurality of color icons, and wherein the third time follows the second time;
in response to receiving the selection of the second color icon,
causing the first color icon to be displayed without the first shading or without the first outline at the third time;
causing the second color icon to be displayed with the at least one of the first shading or the first outline at the third time;
causing a third image of the first item to be downloaded, wherein the third downloaded image depicts the first item in a second color corresponding to the second color icon, and wherein the third downloaded image has the width and height dimensions of the first downloaded image; and
causing presentation of the third downloaded image in the image view section.

12. The computer-implemented method of claim 11, further comprising:
determining that a third location of the mouse cursor is over at least a first portion of the third downloaded image presented in the image view section at a fourth time, wherein the fourth time follows the third time; and
in response to determining that the third location of the mouse cursor is over at least the first portion of the third downloaded image presented in the image view section at the third time,
causing presentation of the image overlay element over at least the first portion of the third downloaded image presented in the image view section to define the overlapping section, wherein the image overlay element has width and height dimensions and the first portion of the third downloaded image over which the image overlay element is presented is at least partially visible through the image overlay element; and
causing presentation of the window element adjacent the image view section, wherein the window element has width and height dimensions,
wherein the window element is presented over the item detail section so as to obscure at least a portion of the item detail section, and
wherein at least a first portion of the fourth downloaded image is visible via the window element and at least a second portion of the fourth downloaded image is not visible via the window element.

13. The computer-implemented method of claim 6, further comprising:
   determining that a third location of the mouse cursor is over a second portion of the first downloaded image presented in the image view section at a third time, wherein the third time follows the first time and precedes the second time; and
   in response to determining that the third location of the mouse cursor is over the second portion of the first downloaded image presented in the image view section at the third time,
      causing presentation of at least a third portion of the second downloaded image to be visible via the window element,
      wherein the overlapping section of the image overlay element over at least the second portion of the first downloaded image corresponds to the third portion of the second downloaded image that is visible via the window element, and
      wherein at least a fourth portion of the second downloaded image is not visible via the window element.

14. The computer-implemented method of claim 6, wherein the product selection tool is aligned along a left side of the item collection section on the first web page.

15. The computer-implemented method of claim 6, wherein the set of selectable features comprises one or more of:
   a category menu;
   a brand menu;
   a color family table;
   a size table;
   a width table;
   a height table;
   a price range selector;
   a material selector; or
   a style selector.

16. The computer-implemented method of claim 6, wherein a pixel count of the second downloaded image is greater than a pixel count of the first downloaded image.

17. The computer-implemented method of claim 6, wherein the second web page further comprises a thumbnail image view section adjacent the image view section,
   wherein the thumbnail image view section comprises a set of selectable thumbnail images,
   wherein individual ones of the selectable thumbnail images of the set depict one of a plurality of views,
   wherein the first view is one of the plurality of views,
   wherein the individual ones of the selectable thumbnail images have height and width dimensions that are smaller than corresponding height and width dimensions of the first downloaded image, and
   wherein a selection of one of the selectable thumbnail images causes an image of the first item in a view corresponding to the selected one of the selectable thumbnail images to be presented in the image view section.

18. The computer-implemented method of claim 17, wherein the thumbnail image view section is provided along a bottom edge of the image view section, and
   wherein individual ones of the set of selectable thumbnail images are aligned substantially horizontally within the thumbnail image view section.

19. The computer-implemented method of claim 17, wherein a pixel count of the first downloaded image is greater than pixel counts of individual ones of the selectable thumbnail images.

20. The computer-implemented method of claim 6, wherein the item detail section is provided along a right edge of the image view section.

21. The computer-implemented method of claim 6, wherein the set of attribute selectors comprises one or more of:
   a color selector; or
   a size selector.

22. The computer-implemented method of claim 6, wherein the window element is presented over the set of attribute selectors, the name of the first item and the price of the first item of the item detail section, and
   wherein the window element is not presented over the textual description of the first item of the item detail section.

23. The computer-implemented method of claim 6, further comprising:
   receiving, from a computer device over a network, at least one of a category or a keyword prior to the first time;
   performing a search of at least one data store for items based at least in part on the at least one of the category or the keyword; and
   identifying at least the set of items based at least in part on the at least one of the category or the keyword as a result of the search,
   wherein the presentation of the first web page via the user interface is caused on a display of the computer device in response to identifying at least the set of items.

24. The computer-method of claim 6, wherein the width dimension of the image overlay element equals the height dimension of the image overlay element, and
   wherein the width dimension of the window element equals the height dimension of the window element.

25. A computer-implemented method comprising:
   receiving a request for information regarding a first item from a computer device over a network;
   generating a first set of program code configured to render a first web page via a browser, wherein the first set of program code comprises:
      program code for displaying an image view section having dimensions $(X_1, Y_1)$ on the first web page, wherein the image view section comprises a first image of the first item, and wherein the first image has the dimensions $(X_1, Y_1)$;
      program code for displaying an item detail section adjacent the image view section, wherein the item detail section comprises:
         a set of attribute selectors;
         a name of the first item;
         a price of the first item;
         a selectable feature configured to add at least one of the first item to a virtual shopping cart associated with a customer account in response to a selection; and
         a narrative description section including a textual description of the first item;
      program code for determining that a mouse cursor is over at least a first portion of the first image presented in the image view section at a first time;
      program code for displaying a window element adjacent the image view section in response to determining that the mouse cursor is over at least the first portion of the first image,
         wherein at least a first portion of a second image of the first item is displayed in the window element,
         wherein the second image has dimensions $(X_2, Y_2)$, wherein the window element has dimensions ($X_3$, $Y_3$), wherein at least a second portion of the second image of the first item is not displayed in the window element, wherein the window element is displayed over the item detail section and obscures at least the set of attribute selectors of the item detail section, and wherein the window element is not displayed over the selectable feature or the narrative description section;

program code for determining dimensions ($X_z$, $Y_z$) according to the equations $X_z=X_1(X_3/X_2)$ and $Y_1=Y_1(Y_3/Y_2)$; and program code for displaying, in response to determining that the mouse cursor is over at least the first portion of the first image, an image overlay element over at least the first portion of the first image, wherein the first portion of the first image is at least partially visible through the image overlay element, and wherein the image overlay element has the dimensions ($X_z$, $Y_z$).

26. The computer-implemented method of claim 25, further comprising:

generating a second set of program code configured to render a second web page via the browser, wherein the second set of program code comprises:

program code for displaying information regarding a set of items in a spaced relationship within a window, wherein the information regarding the set of items comprises an image, a name and a price for individual ones of the items of the set; and program code for displaying a product selection tool section comprising a set of selectable features associated with at least one of the items of the set of items within the window, wherein individual ones of the selectable features are associated with item characteristics, and wherein, in response to a selection of one of the selectable features, the set of items presented in the item collection section is narrowed to include items having the item characteristic associated with the one of the selectable features, wherein the first item is one of the items of the set, and wherein receiving the request for information regarding the first item comprises:

receiving a selection of at least some of the information regarding the first item via the second web page.

27. The computer-implemented method of claim 6, wherein the item collection section further comprises:

at least one sorting tool having a plurality of selectable features, wherein individual ones of the selectable features are associated with sort preferences, and wherein, in response to a selection of one of the selectable features, the set of items presented in the item collection section is sorted based on the sort preference associated with the one of the selectable features.

28. The computer-implemented method of claim 27, wherein the sort preferences include a plurality of brand names, and wherein, in response to a selection of one of the selectable features, the set of items presented in the item collection section is sorted based on the brand name associated with the one of the selectable features.

29. The computer-implemented method of claim 6, wherein one of the selectable features is a price selector slider comprising a minimum price selector and a maximum price selector, wherein the price selector slider comprises a plurality of positions, wherein each of the positions corresponds to a price, and wherein each of the items of the set has a price between a minimum price corresponding to a position of the minimum price selector and a maximum price corresponding to a position of the maximum price selector.

30. The computer-implemented method of claim 6, wherein each of the items of the set is one of a shoe or a handbag.

31. The computer-implemented method of claim 6, wherein the first web page is continuously presented and unrefreshed as the set of items presented in the item collection section is narrowed to include the items having the item characteristic associated with the one of the selectable features in response to the selection of the one of the selectable features.

32. The computer-implemented method of claim 6, wherein the product selection tool further comprises a set of unselectable features, wherein individual ones of the unselectable features are associated with item characteristics, wherein none of the items of the set has any of the item characteristics associated with the unselectable features, wherein each of the selectable features is displayed in one of a first color or a first font, and wherein each of the unselectable features is displayed in one of a second color or a second font.

33. The computer-implemented method of claim 6, wherein the second color or the second font is phantom.

* * * * *